US011929024B2

(12) United States Patent
Kim et al.

(10) Patent No.: US 11,929,024 B2
(45) Date of Patent: Mar. 12, 2024

(54) ORGANIC LIGHT EMITTING DISPLAY DEVICE

(71) Applicant: LG Display Co., Ltd., Seoul (KR)

(72) Inventors: Minsu Kim, Goyang-si (KR); Wonkeun Park, Seoul (KR); Haejun Park, Paju-si (KR); Jieun Kang, Jeonju-si (KR); Youngtaek Hong, Gangneung-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/536,848

(22) Filed: Nov. 29, 2021

(65) Prior Publication Data

US 2022/0199016 A1 Jun. 23, 2022

(30) Foreign Application Priority Data

Dec. 18, 2020 (KR) ........................ 10-2020-0178859

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 10,490,128 B1 | 11/2019 | Qian et al. | | |
| 10,902,789 B2 * | 1/2021 | Park | G09G 3/3225 | |
| 2008/0042942 A1 * | 2/2008 | Takahashi | G09G 3/3291 | 345/77 |
| 2009/0251496 A1 * | 10/2009 | Saito | G09G 3/3283 | 345/690 |
| 2011/0057919 A1 * | 3/2011 | Kim | G09G 3/3233 | 345/82 |
| 2013/0229404 A1 * | 9/2013 | Ishida | H04N 5/63 | 345/212 |
| 2016/0063963 A1 * | 3/2016 | Hsu | G09G 3/2011 | 345/213 |
| 2017/0263183 A1 * | 9/2017 | Lin | G09G 3/3233 | |

(Continued)

FOREIGN PATENT DOCUMENTS

| | | |
|---|---|---|
| CN | 106097976 A | 11/2016 |
| CN | 107452334 A | 12/2017 |

(Continued)

OTHER PUBLICATIONS

Extended European Search Report, European Patent Office Application No. 21214257.4, dated Apr. 29, 2022, 12 pages.

(Continued)

*Primary Examiner* — Dorothy Harris
(74) *Attorney, Agent, or Firm* — Fenwick & West LLP

(57) ABSTRACT

The organic light emitting display device is driven to be divided into a refresh frame when the data voltage is programmed in the pixel and a reset frame when the anode electrode of the organic light emitting diode is reset, and the data voltage is maintained to a first level during the reset frame. Accordingly, a separate stage for applying an on bias stress is not provided so that the bezel may be reduced.

11 Claims, 25 Drawing Sheets

(56) References Cited

U.S. PATENT DOCUMENTS

| | | | | |
|---|---|---|---|---|
| 2018/0075801 | A1* | 3/2018 | Le | G09G 3/3233 |
| 2019/0057646 | A1* | 2/2019 | Lin | G09G 3/3225 |
| 2019/0130823 | A1* | 5/2019 | Yang | G09G 3/3225 |
| 2019/0371237 | A1 | 12/2019 | Qian et al. | |
| 2019/0385530 | A1* | 12/2019 | Gao | G09G 3/3258 |
| 2020/0226978 | A1* | 7/2020 | Lin | H01L 29/7869 |
| 2021/0118361 | A1* | 4/2021 | Li | G09G 3/3233 |

FOREIGN PATENT DOCUMENTS

| | | | |
|---|---|---|---|
| CN | 109087610 | A | 12/2018 |
| CN | 109410832 | A | 3/2019 |
| CN | 110570818 | A | 12/2019 |
| KR | 10-2018-0072440 | A | 6/2018 |

OTHER PUBLICATIONS

China National Intellectual Property Administration, Office Action, CN Patent Application No. 202111459278.1, dated Oct. 16, 2023, 25 pages.

* cited by examiner

SC2(n): SC2_Odd(n) or SC2_Even(n)

SC2(n): SC2_Odd(n) or SC2_Even(n)

SC2(n): SC2_Odd(n) or SC2_Even(n)

ORGANIC LIGHT EMITTING DISPLAY DEVICE

CROSS-REFERENCE TO RELATED APPLICATION

This application claims the priority of Republic of Korea Patent Application No. 10-2020-0178859 filed on Dec. 18, 2020, in the Korean Intellectual Property Office, the disclosure of which is hereby incorporated by reference in its entirety.

BACKGROUND

Field

The present disclosure relates to an organic light emitting display device, and more particularly, to an organic light emitting display device having a variable driving frequency.

Description of the Related Art

An organic light emitting diode (OLED) which is a self-emitting device includes an anode electrode, a cathode electrode, and an organic compound layer formed therebetween. The organic compound layer comprises at least a hole transport layer (HTL), an emission layer (EML), and an electron transport layer (ETL). When a driving voltage is applied to the anode electrode and the cathode electrode, holes which pass through the hole transport layer HTL and electrons which pass through the electron transport layer ETL move to the emission layer EML to form excitons so that the emission layer EML generates visible rays. An active matrix type organic light emitting display device includes one or more an organic light emitting diodes OLED which is a self-emitting device and is used in various ways with the advantages of a fast response speed, large emission efficiency, luminance, and viewing angle.

The organic light emitting display device comprises pixels, each including an organic light emitting diode, the pixels are disposed in a matrix, wherein the luminance of the pixel is adjusted in accordance with a gray scale level of video data.

Each pixel includes at least an organic light emitting diode, a driving transistor configured to control a driving current flowing through the organic light emitting diode in accordance with a voltage between the gate and the source and at least one switching transistor which programs the voltage between the gate and the source of the driving transistor.

As the driving of the organic light emitting display device is maintained, a hysteresis phenomenon in which a threshold voltage Vth of the driving transistor changes occurs. In order to relieve the hysteresis phenomenon of the driving transistor, an on bias stress needs to be applied to the driving transistor to flow the source-drain current Ids of the driving transistor. In order to apply the on bias stress to the driving transistor, it is necessary to raise an initialization voltage which might be a low level to a high level even in one frame.

Therefore, a separate stage for the swing of the initialization voltage needs to be provided, which is included in the gate driver. Accordingly, the organic light emitting display device includes a separate stage in the gate driver to apply an on bias stress to the driving transistor so that there are problems in that a bezel is increased and a driving power consumption is increased.

SUMMARY

An organic light emitting display device with a newly designed pixel circuit to apply an on bias stress without including a separate stage is disclosed.

Accordingly, an object of the present disclosure is to provide an organic light emitting display device configured to apply an on bias stress to the driving transistor without increasing the bezel.

Another object to be achieved by the present disclosure is to provide a display device and a method for operating a display device which relieves the hysteresis of the driving transistor while reducing power consumption.

Objects of the present disclosure are not limited to the above-mentioned objects, and other objects, which are not mentioned above, can be clearly understood by those skilled in the art from the following descriptions.

In order to achieve the above-described object, according to an aspect of the present disclosure, an organic light emitting display device includes a display panel in which a plurality of pixels is disposed. Each of the plurality of pixels includes an organic light emitting diode configured to emit light by a driving current, a first transistor configured to control the driving current and including a source electrode which is a first node, a gate electrode which is a second node, and a drain electrode which is a third node, a second transistor configured to apply a data voltage to the first node, a third transistor configured to form a diode connection between the second node and the third node, a fourth transistor configured to apply an initialization voltage to the first transistor, a fifth transistor configured to apply a high potential driving voltage to the first node, a sixth transistor configured to form a current path between the driving transistor and the organic light emitting diode, a seventh transistor configured to apply a reset voltage to a fourth node which is an anode electrode of the organic light emitting diode, and a storage capacitor including one electrode connected to the second node and the other electrode connected to a high potential driving voltage line which transmits the high potential driving voltage. The organic light emitting display device is driven to be divided into a refresh frame when the data voltage is programmed in the pixel and a reset frame when the anode electrode of the organic light emitting diode is reset, and the data voltage is maintained to a first level during the reset frame. Accordingly, a separate stage for applying an on bias stress is not provided so that the bezel may be reduced.

Other detailed matters of the exemplary embodiments are included in the detailed description and the drawings.

According to the present disclosure, a separate stage which swings the initialization voltage may not be provided to apply an on bias stress so that a width of the bezel may be reduced.

According to the present disclosure, there is no need to drive a separate stage for applying an on bias stress so that the power consumption may also be reduced.

According to the present disclosure, there is no need to form a separate stage for applying the on bias stress, so that the manufacturing process yield of the gate driver may be improved.

According to the present disclosure, the gate-source voltage of the transistor is reduced to suppress the leakage current of the transistor during an anode reset frame.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
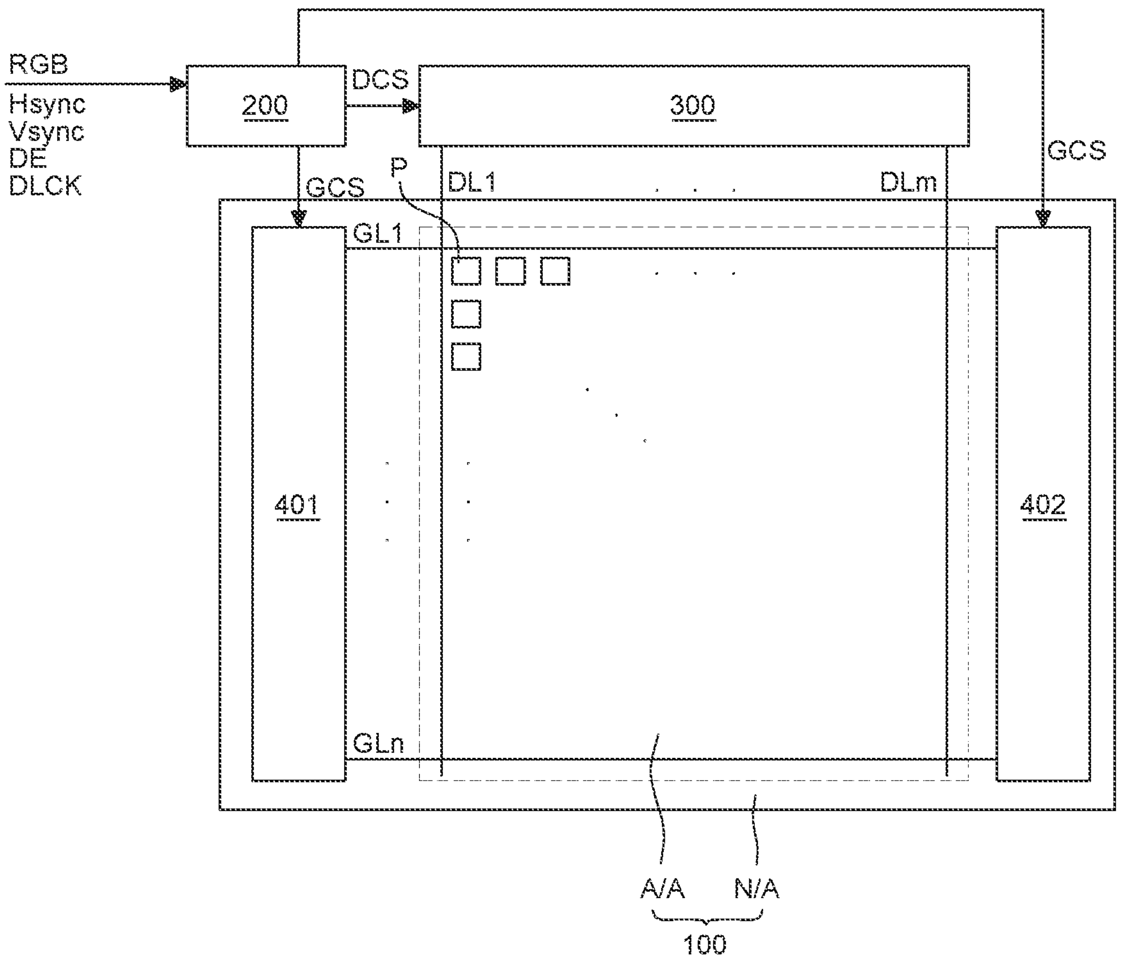
FIG. 1 is a block diagram of an organic light emitting display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as “including,” “having,” and “comprising” used herein are generally intended to allow other components to be added unless the terms are used with the term “only”. Any references to singular may include plural unless expressly stated otherwise.

Components are interpreted to include an ordinary error range even if not expressly stated.

When the position relation between two parts is described using the terms such as “on”, “above”, “below”, and “next”, one or more parts may be positioned between the two parts unless the terms are used with the term “immediately” or “directly”.

When an element or layer is disposed “on” another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Same reference numerals generally denote same elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

A low level of a signal may be defined as a first level and a high level of a signal may be defined as a second level.

Hereinafter, a display device according to exemplary embodiments of the present disclosure will be described in detail with reference to accompanying drawings.

FIG. 1 is a block diagram of an organic light emitting display device according to an exemplary embodiment of the present disclosure.

Referring to FIG. 1, an organic light emitting display device according to an exemplary embodiment of the present disclosure includes a display panel 100, a timing control circuit 200, a data driver 300, and gate drivers 401 and 402.

The display panel 100 includes a display area A/A which displays images and a non-display area N/A which is disposed at the outside of the display area A/A and has various signal lines and the gate drivers 401 and 402 disposed therein. The non-display area N/A does not disclose images.

In the display area A/A, in order to display images, a plurality of pixels P is disposed. In the display area A/A, n gate lines GL1 to GLn are disposed in a first direction and m data lines DL1 to DLm are disposed in a direction different from the first direction. The plurality of pixels P are electrically connected to the n gate lines GL1 to GLn and the m data lines DL1 to DLm. Accordingly, gate voltages and data voltages are applied to the pixels P through the gate lines GL1 to GLn and the data lines DL1 to DLm, respectively. Further, each pixel P implements gray scales by the gate voltage and the data voltage. Accordingly, the image is displayed in the display area A/A by the gray scale displayed by each pixel P.

In the non-display area N/A, various signal lines GL1 to GLn and DL1 to DLm which transmit signals to control the operation of the pixels P disposed in the display area A/A and the gate drivers 401 and 402 are disposed.

The timing control circuit 200 transmits an input image data RGB, which is received from a host system, to the data driver 300.

The timing control circuit 200 generates control signals GCS and DCS for controlling operation timings of the gate drivers 401 and 402 and the data driver 300 using timing signals, such as a clock signal DCLK, a horizontal synchronization signal Hsync, a vertical synchronization signal Vsync, and a data enable signal DE. The timing signals are received together with the image data RGB. In this case, the horizontal synchronization signal Hsync is a signal indicating a time taken to display one horizontal line of a screen and the vertical synchronization signal Vsync is a signal indicating a time taken to display a screen of one frame. Further, the data enable signal DE is a signal indicating a period when a data voltage is supplied to a pixel P defined in the display panel 100.

In other words, the timing control circuit 200 is applied with the timing signal to output a gate control signal GCS to the gate drivers 401 and 402 and output a data control signal DCS to the data driver 300.

The data driver 300 is applied with the data control signal DCS to output a data voltage to the data lines DL1 to DLm.

Specifically, the data driver 300 generates a sampling signal in accordance with the data control signal DCS and latches the image data RGB in accordance with the sampling signal to be converted into a data voltage and then supplies the data voltage to the data lines DL1 to DLm in response to a source output enable (SOE) signal.

The data driver 300 is connected to a bonding pad of the display panel 100 by a chip on glass (COG) method or may be directly disposed on the display panel 100. In some cases, the data driver 300 may be disposed to be integrated with the display panel 100. Further, the data driver 300 may be disposed by a chip on film (COF) method.

The gate drivers 401 and 402 sequentially supply a scan signal and an emission signal corresponding to the gate voltage to the gate lines GL1 to GLn, in accordance with the gate control signal GCS.

The general gate drivers 401 and 402 are formed independently from the display panel 100 to be electrically connected to the display panel in various ways. However, the gate drivers 401 and 402 of the organic light emitting display device according to the exemplary embodiment of the present disclosure are formed to have a thin film pattern when a substrate of the display panel 100 is manufactured to be embedded on the non-display area N/A in a gate in panel GIP manner.

The gate drivers 401 and 402 may be divided into a first gate driver 401 and a second gate driver 402 which are disposed on both sides of the display panel 100.

Specifically, the first gate driver 401 supplies the scan signal and the emission signal to the plurality of pixels P. Therefore, the first gate driver 401 may include a plurality of scan driving stages and a plurality of emission driving stages. The plurality of scan driving stages supplies the scan signal to the plurality of pixels P and the plurality of emission driving stages supplies the emission signal to the plurality of pixels P.

The second gate driver 402 also supplies the scan signal and the emission signal to the plurality of pixels P. Therefore, the second gate driver 402 may include a plurality of scan driving stages and a plurality of emission driving stages. The plurality of scan driving stages supplies the scan signal to the plurality of pixels P and the plurality of emission driving stages supplies the emission signal to the plurality of pixels P.

Hereinafter, a configuration and a driving method of the plurality of pixels P will be described in detail.

Switch elements which configure each of the plurality of pixels P may be implemented by an n-type and/or a p-type MOSFET transistor. In the following exemplary embodiment, an n-type transistor will be described as an example, but the present disclosure is not limited thereto.

Additionally, a transistor is a three-electrode element including a gate electrode, a source electrode, and a drain electrode. The source electrode is an electrode which supplies carriers to the transistor. In the transistor, the carriers flow from the source electrode. The drain electrode is an electrode through which the carriers leave the transistor to the outside. Accordingly, the carrier in the MOSFET flows from the source electrode to the drain electrode. In the case of the n-type MOSFET NMOS, since the carriers are electrons, in order to allow the electrons to flow from the source electrode to the drain electrode, a voltage of the source electrode is less than a voltage of the drain electrode. In the n-type MOSFET, since the electrons flow from the source electrode to the drain electrode, the current flows from the drain electrode to the source electrode. In the case of the p-type MOSFET (PMOS), since the carriers are holes, in order to allow the holes to flow from the source electrode to the drain electrode, a voltage of the source electrode is higher than a voltage of the drain electrode. In the p-type MOSFET, since the holes flow from the source electrode to the drain electrode, the current flows from the source electrode to the drain electrode. However, it should be noted that the source electrode and the drain electrode of the MOSFET are not fixed. For example, the source electrode and the drain electrode of the MOSFET may be changed depending on the applied voltage. In the following exemplary embodiment, the present disclosure should not be limited by the source electrode and the drain electrode of the transistor.

Further, in the following description, for the convenience of description, a high level voltage and a low level voltage have been mentioned, but the present disclosure is not limited thereto. Therefore, the high level voltage and the low level voltage may be changed to a low level voltage and a high level voltage in accordance with a type of the transistor and the high level voltage may be defined as a first level and the low level voltage may be defined as a second level.

One Exemplary Embodiment of Present Disclosure—Example 1

Figure 2:
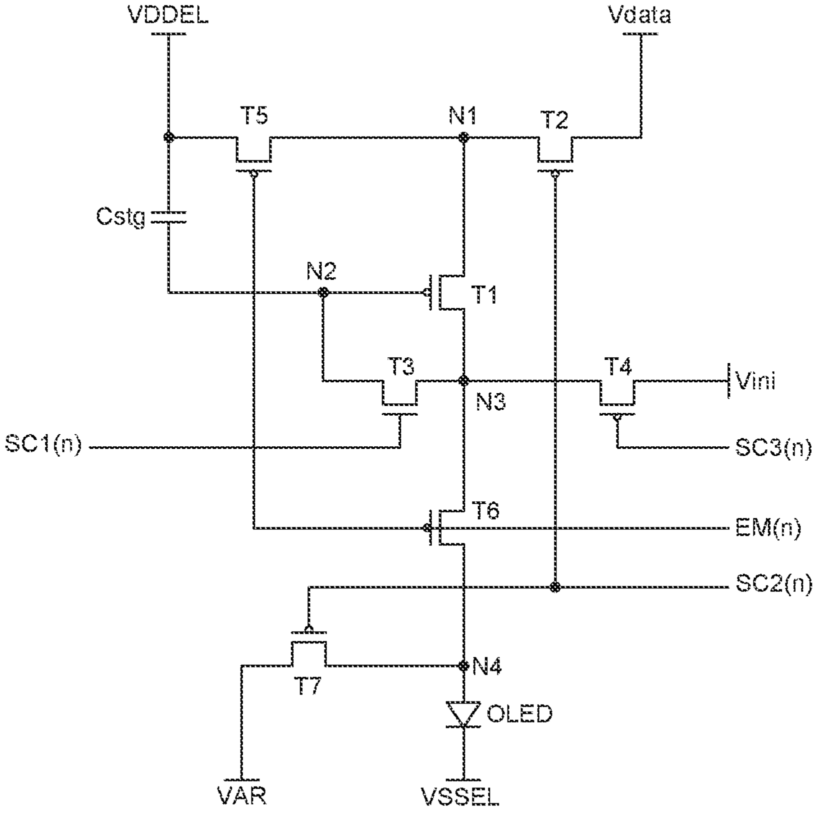
FIG. 2 is a circuit diagram illustrating a pixel of an organic light emitting display device according to an exemplary embodiment of the present disclosure.

FIG. 2 is a circuit diagram illustrating a pixel of an organic light emitting display device according to an exemplary embodiment of the present disclosure.

To be specific, FIG. 2 illustrates each pixel of an odd row and a circuit diagram of each pixel of an even row is the same as each pixel of an odd row except for an odd-numbered second scan signal SC2_Odd(n). In each pixel of an even row, an even-numbered second scan signal SC2_Even(n) is supplied instead of the odd-numbered second scan signal SC2_Odd(n).

Each pixel P includes an organic light emitting diode OLED, a driving transistor T1, second to seventh transistors T2 to T7, and a storage capacitor Cstg.

The organic light emitting diode OLED emits light by a driving current supplied from the driving transistor T1. A multilayered organic compound layer is formed between the anode electrode and the cathode electrode of the organic light emitting diode OLED. The organic compound layer may include at least one of a hole transfer layer and an electron transfer layer and an emission layer (EML). Here, the hole transfer layer is a layer which injects or transfers holes to the emission layer and for example, may include a hole injection layer (HIL), a hole transport layer (HTL), and an electron blocking layer (EBL). The electron transfer layer is a layer which injects or transfers the electrons to the emission layer and for example, may include an electron transport layer (ETL), an electron injection layer (EIL), and a hole blocking layer (HBL). An anode electrode of the organic light emitting diode OLED is connected to a fourth node N4 and a cathode electrode of the organic light emitting diode is connected to an input terminal of a low potential driving voltage VSSEL.

The driving transistor T1 controls a driving current applied to the organic light emitting diode OLED in accordance with a source-gate voltage Vsg. The driving transistor T1 may be a p-type MOSFET (PMOS) and a low temperature polycrystalline silicon (LTPS) thin film transistor. A source electrode of the driving transistor T1 is connected to a first node N1, a gate electrode is connected to a second node N2, and a drain electrode is connected to a third node N3. The driving transistor T1 may be referred to as a first transistor.

The second transistor T2 applies a data voltage Vdata supplied from a data line to the first node N1 which is the source electrode of the driving transistor T1. The second transistor T2 may be a p-type MOSFET (PMOS) and a low temperature polycrystalline silicon (LTPS) thin film transistor. The second transistor T2 includes a source electrode connected to the data line, a drain electrode connected to the first node N1, and a gate electrode connected to a second scan signal line which transmits an odd-numbered second scan signal SC2_Odd(n). Accordingly, the second transistor T2 applies a data voltage Vdata supplied from the data line to the first node N1 which is the source electrode of the driving transistor T1, in response to a low level of the odd-numbered second scan signal SC2_Odd(n) which is a turn on level.

The third transistor T3 forms a diode connection between a gate electrode and a drain electrode of the driving transistor T1. The third transistor T3 may be an n-type MOSFET (NMOS) and an oxide thin film transistor to reduce a leakage current. The third transistor T3 includes the drain electrode connected to the third node N3, a source electrode connected to the second node N2, and the gate electrode connected to a first scan signal line which transmits a first scan signal SC1(*n*). Therefore, the third transistor T3 forms a diode connection between the gate electrode and the drain electrode of the driving transistor T1 in response to a high level of the first scan signal SC1(*n*) which is a turn on level.

The fourth transistor T4 applies an initialization voltage Vini to the third node N3 which is the drain electrode of the driving transistor T1. The fourth transistor T4 may be a p-type MOSFET (PMOS) and a low temperature polycrystalline silicon (LTPS) thin film transistor. The fourth transistor T4 includes a source electrode connected to an initialization voltage line which transmits an initialization voltage Vini, a drain electrode connected to the third node N3, and a gate electrode connected to a third scan signal line which transmits a third scan signal SC3(*n*). Accordingly, the fourth transistor T4 applies the initialization voltage Vini to the third node N3 which is the drain electrode of the driving transistor T1, in response to a low level of third scan signal SC3(*n*) which is a turn on level.

The fifth transistor T5 applies a high potential driving voltage VDDEL to the first node N1 which is the source electrode of the driving transistor T1. The fifth transistor T5 may be a p-type MOSFET (PMOS) and a low temperature polycrystalline silicon (LTPS) thin film transistor. The fifth transistor T5 includes a source electrode connected to a high potential driving voltage line which transmits a high potential driving voltage VDDEL, a drain electrode connected to the first node N1, and a gate electrode connected to an emission signal line which transmits an emission signal EM(n). Accordingly, the fifth transistor T5 applies the high potential driving voltage VDDEL to the first node N1 which is the source electrode of the driving transistor T1, in response to a low level of emission signal EM(n) which is a turn on level.

The sixth transistor T6 forms a current path between the driving transistor T1 and the organic light emitting diode OLED. The sixth transistor T6 may be a p-type MOSFET (PMOS) and a low temperature polycrystalline silicon (LTPS) thin film transistor. The sixth transistor T6 includes a source electrode connected to the third node N3, a drain electrode connected to the fourth node N4, and a gate electrode connected to the emission signal line which transmits an emission signal EM(n). The sixth transistor T6 forms a current path between the third node N3 which is the source electrode of the sixth transistor T6 and the fourth node N4 which is the drain electrode of the sixth transistor T6, in response to the emission signal EM(n). Accordingly, the sixth transistor T6 forms a current path between the driving transistor T1 and the organic light emitting diode OLED in response to a low level of emission signal EM(n) which is a turn on level.

The seventh transistor T7 applies a reset voltage VAR to the fourth anode N4 which is an anode of the organic light emitting diode. The seventh transistor T7 may be a p-type MOSFET (PMOS) and a low temperature polycrystalline silicon (LTPS) thin film transistor. The seventh transistor T7 includes a source electrode connected to the reset voltage line which transmits the reset voltage VAR, a drain electrode connected to the fourth node N4, and a gate electrode connected to a second scan signal line which transmits an odd-numbered second scan signal SC2_Odd(n). Accordingly, the seventh transistor T7 applies the reset voltage VAR to the fourth node N4 which is the anode of the organic light emitting diode, in response to a low level of the odd-numbered second scan signal SC2_Odd(n) which is a turn on level.

The storage capacitor Cstg holds a data voltage Vdata stored in each pixel for one frame. The storage capacitor Cstg includes a first electrode connected to the second node N2 and a second electrode connected to the high potential driving voltage line which transmits a high potential driving voltage VDDEL. That is, one electrode of the storage capacitor Cstg is connected to the gate electrode of the driving transistor T1 and the other electrode of the storage capacitor Cstg is connected to the high potential driving voltage line VDL which transmits a high potential driving voltage VDDEL.

Figure 3:
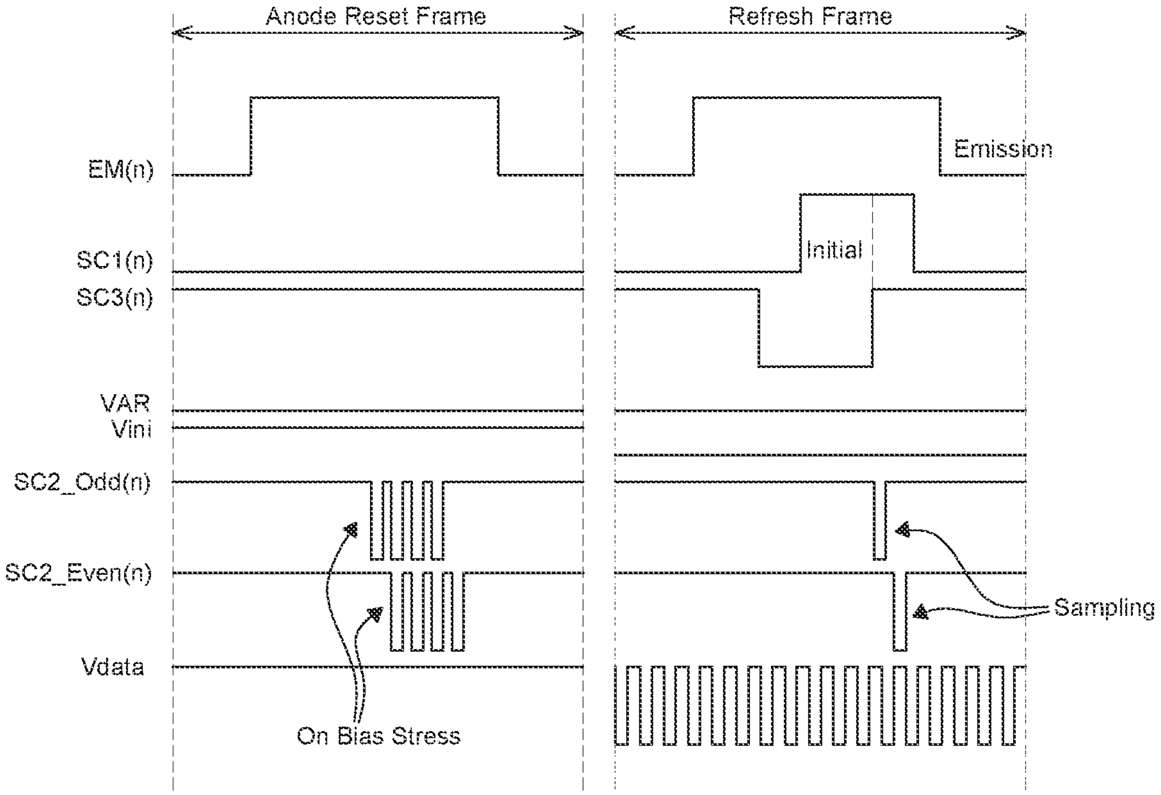
FIG. 3 is a waveform illustrating a signal which is applied to a pixel of an organic light emitting display device during one frame according to an exemplary embodiment of the present disclosure.

FIG. 3 is a waveform illustrating a signal which is applied to a pixel of an organic light emitting display device according to an exemplary embodiment of the present disclosure during one frame.

Figure 4A:
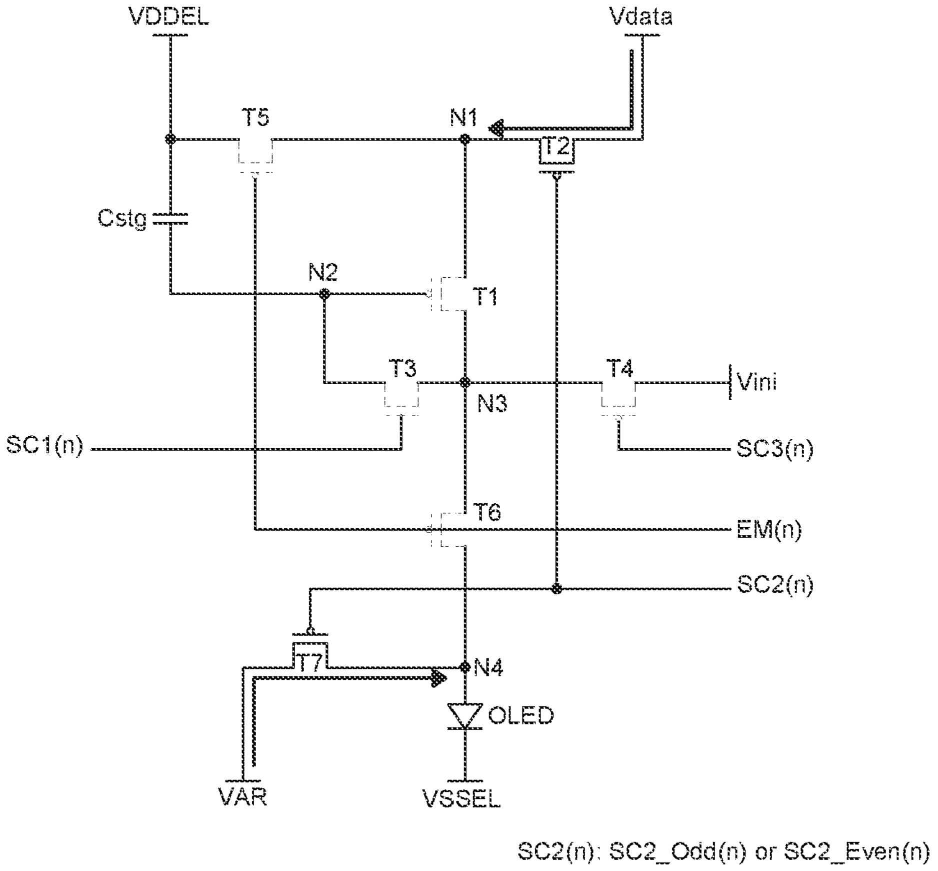
FIG. 4A is a circuit diagram of a pixel of an organic light emitting display device during an on bias stress period according to an exemplary embodiment of the present disclosure.

FIG. 4A is a circuit diagram of a pixel of an organic light emitting display device during an on bias stress period according to an exemplary embodiment of the present disclosure.

Figure 4B:
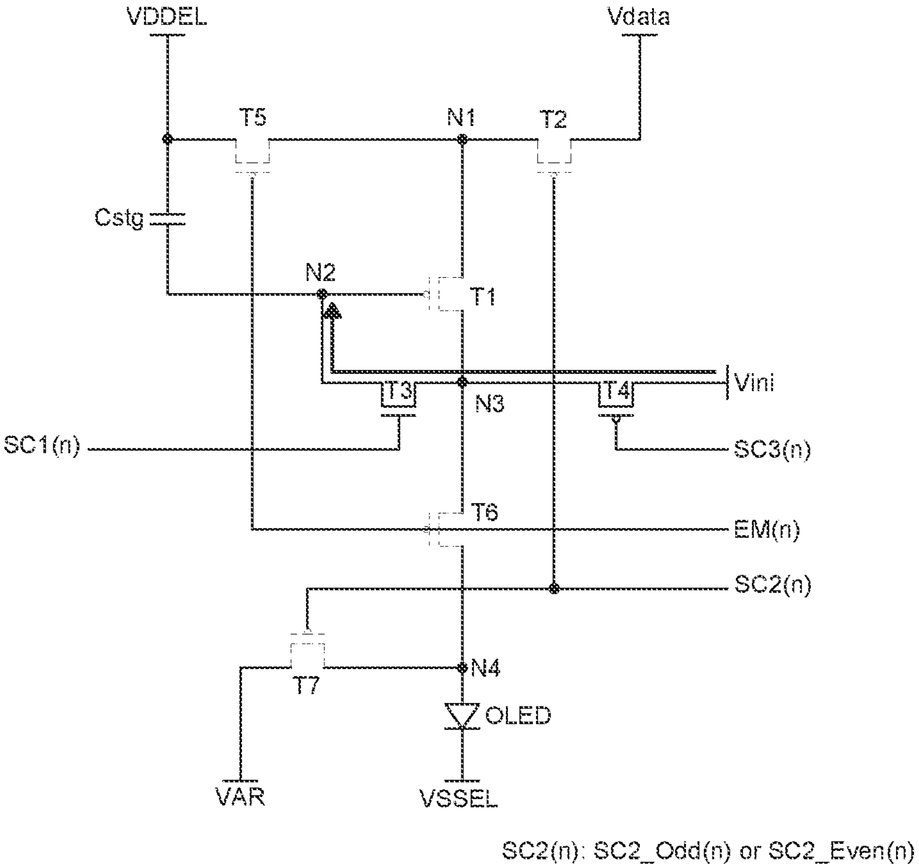
FIG. 4B is a circuit diagram of a pixel of an organic light emitting display device during an initial period according to an exemplary embodiment of the present disclosure.

FIG. 4B is a circuit diagram of a pixel of an organic light emitting display device during an initial period according to an exemplary embodiment of the present disclosure.

Figure 4C:
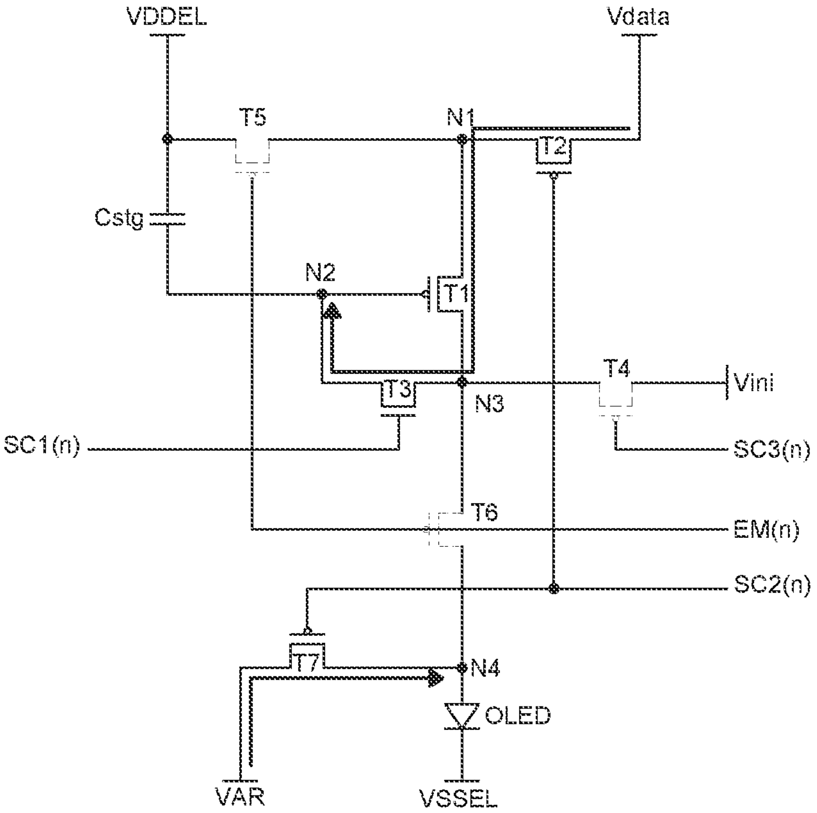
FIG. 4C is a circuit diagram of a pixel of an organic light emitting display device during a sampling period according to an exemplary embodiment of the present disclosure.

FIG. 4C is a circuit diagram of a pixel of an organic light emitting display device during a sampling period according to an exemplary embodiment of the present disclosure.

Figure 4D:
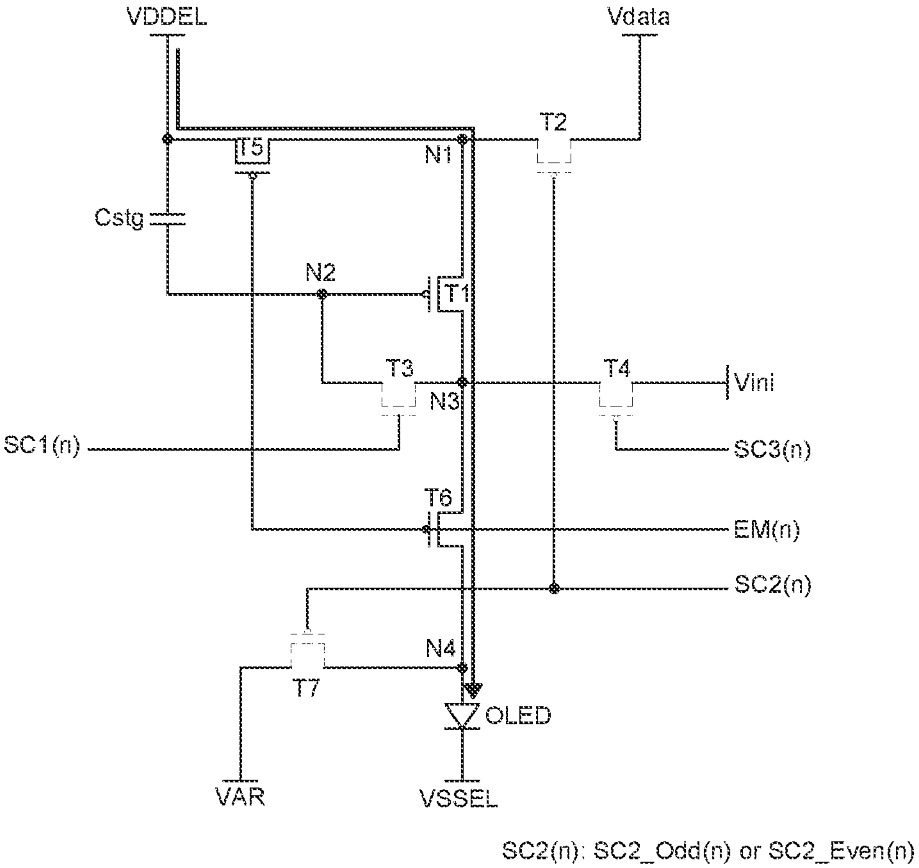
FIG. 4D is a circuit diagram of a pixel of an organic light emitting display device during an emission period according to an exemplary embodiment of the present disclosure.

FIG. 4D is a circuit diagram of a pixel of an organic light emitting display device during an emission period according to an exemplary embodiment of the present disclosure.

The driving of the pixel of the organic light emitting display device according to the exemplary embodiment of the present disclosure will be described with reference to FIGS. 2 to 4D, as follows.

The organic light emitting display device according to the exemplary embodiment of the present disclosure may be driven to be divided into a refresh frame and an anode reset frame. In the refresh frame, the data voltage Vdata is programmed in each pixel P and the organic light emitting diode OLED emits light. The anode reset frame may be a vertical blank frame and the anode electrode of the organic light emitting diode OLED is reset during the anode reset frame.

In the organic light emitting display device according to the exemplary embodiment of the present disclosure, the anode reset frame may include a plurality of on bias stress periods (hereinafter, referred to as "stress periods"). The stress period (on bias stress) is a period in which a bias stress is applied to the first node N1 which is the source electrode of the driving transistor T1. Further, during the stress period, the anode electrode of the organic light emitting diode OLED may be reset. Further, as illustrated in FIG. 3, during the anode reset frame, the reset voltage VAR is a low level and the initialization voltage Vini and the data voltage Vdata are high levels.

In the organic light emitting display device according to the exemplary embodiment of the present disclosure, the refresh frame may be divided into an initial period, a sampling period, and an emission period. The initial period is a period in which the voltage of the third node N3 which is the drain electrode of the driving transistor T1 is initialized. The sampling period is a period in which a threshold voltage Vth of the driving transistor T1 is sampled and the data voltage Vdata is programmed. The emission period is a period in which the organic light emitting diode OLED emits light in accordance with the driving current by the source-gate voltage of the programmed driving transistor T1. As illustrated in FIG. 3, during the refresh frame, the reset voltage VAR and the initialization voltage Vini are low levels.

Specifically, referring to FIGS. 3 and 4A, during the stress period (on bias stress) of the anode reset frame, the odd-numbered second scan signal SC2_Odd(n) is a low level which is a turn on level. In other words, in the anode reset frame including a plurality of stress periods (on bias stress), the odd-numbered second scan signal SC2_Odd(n) may have a waveform including a plurality of pulses. In the anode reset frame including a plurality of stress periods (on bias stress), the data voltage Vdata is always a high level.

Therefore, the seventh transistor T7 is turned on to apply the reset voltage VAR to the fourth node N4. That is, the anode electrode of the organic light emitting diode OLED is reset to the reset voltage VAR.

Therefore, the second transistor T2 is turned on to apply a high level of data voltage Vdata to the first node N1. The high level of data voltage Vdata may be selected in a voltage range which is sufficiently higher than an operating voltage of the organic light emitting diode OLED and may be set to a voltage equal to or less than a high potential driving voltage VDDEL. That is, during the stress period (on bias stress), the on bias stress is applied to the first node N1 which is the source electrode of the driving transistor T1 to drop the gate-source voltage Vgs of the driving transistor T1. Accordingly, during the stress period (on bias stress), the source-drain current Ids of the driving transistor T1 flows to relieve the hysteresis of the driving transistor T1.

In the anode reset frame, the initialization voltage Vini may be a high level. Therefore, a high level of third scan signal SC3(*n*) is applied to the gate electrode of the fourth transistor T4 and a high level of initialization voltage Vini is applied to the source electrode of the fourth transistor T4 so that a potential difference between the gate electrode and the source electrode of the fourth transistor T4 may be reduced. Accordingly, during the anode reset frame, the leakage current of the fourth transistor T4 may be reduced.

Referring to FIGS. 3 and 4B, during an initial period of the refresh frame, the first scan signal SC1(*n*) is a high level which is a turn on level and the third scan signal SC3($n$) is a low level which is a turn on level. Therefore, the third transistor T3 and the fourth transistor T4 are turned on to apply the initialization voltage Vini to the third node N3 and the second node N2. As a result, the gate electrode and the drain electrode of the driving transistor T1 are initialized to the initialization voltage Vini. In the refresh frame, the initialization voltage Vini may be selected in a voltage range which is sufficiently less than an operating voltage of the organic light emitting diode OLED and may be set to a voltage equal to or less than a low potential driving voltage VSSEL.

Referring to FIGS. 3 and 4C, during a sampling period of the refresh frame, the first scan signal SC1($n$) is a high level which is a turn on level and the odd-numbered second scan signal SC2_Odd(n) is a low level which is a turn on level. During the sampling period of the refresh frame, the first scan signal SC1($n$) is a high level which is a turn on level and an odd-numbered second scan signal SC2_Odd(n) is a low level which is a turn on level. In FIG. 3, in the refresh frame, the odd-numbered second scan signal SC2_Odd(n) is illustrated by a waveform including one pulse. However, the present disclosure is not limited thereto and the odd-numbered second scan signal SC2_Odd(n) may have a waveform including a plurality of pulses.

Therefore, during the sampling period, the second transistor T2 is turned on so that the data voltage Vdata is applied to the first node N1. Further, the third transistor T3 is also turned on so that the driving transistor T1 forms a diode connection. Therefore, the gate electrode and the drain electrode of the driving transistor T1 are shorted so that the driving transistor T1 operates as a diode. During the sampling period, a current Ids flows between the source and the drain of the driving transistor T1. The gate electrode and the drain electrode of the driving transistor T1 are diode-connected, so that the voltage of the second node N2 rises by the current flowing from the source electrode to the drain electrode until the gate-source voltage Vgs of the driving transistor T1 becomes Vth. During the sampling period, the voltage of the second node N2 is charged with a voltage Vdata−|Vth| corresponding to the difference between the data voltage Vdata and the threshold voltage Vth of the driving transistor T1.

Further, during the sampling period of the refresh frame, the odd-numbered second scan signal SC2_Odd(n) is a low level which is a turn on level, so that the seventh transistor T7 is turned on to apply the reset voltage VAR to the fourth node N4. That is, the anode electrode of the organic light emitting diode OLED is reset to the reset voltage VAR.

Further, in the refresh frame, when the odd-numbered second scan signal SC2_Odd(n) has a waveform including a plurality of pulses, the second transistor T2 is turned on to apply the data voltage Vdata to the first node N1. Therefore, also in the refresh frame, the bias stress is applied to the first node N1 which is the source electrode of the driving transistor T1 to relieve the hysteresis of the driving transistor T1.

Referring to FIGS. 3 and 4D, during the emission period of the refresh frame, the emission signal EM(n) is a low level which is a turn on level. Therefore, the fifth transistor T5 is turned on to apply the high potential driving voltage VDDEL to the first node N1. The sixth transistor T6 is also turned on to form a current path of the third node N3 and the fourth node N4. As a result, a driving current Ioled passing through the source electrode and the drain electrode of the driving transistor T1 is applied to the organic light emitting diode OLED.

A relational expression of the driving current Ioled flowing through the organic light emitting diode OLED during the emission period is represented by the following Equation 1.

$$Ioled = k/2(Vgs + |Vth|)^2 = k/2(Vg - Vs + |Vth|)^2 = k/2(Vdata - +|Vth| - VDD + |Vth|)^2 = k/2(Vdata - VDD)^2 \quad \text{[Equation 1]}$$

In Equation 1, k/2 is a proportional constant determined by an electron mobility of the driving transistor T1, a parasitic capacitance, a channel capacity, and the like.

As seen from Equation 1, it is understood that in the relational expression of the driving current Ioled, a component of the threshold voltage Vth of the driving transistor T1 is eliminated so that even though in the display device of the present disclosure, the threshold voltage Vth changes, the driving current Ioled does not change. As described above, the display device of the present disclosure may program the data voltage regardless of the variation of the threshold voltage Vth during the sampling period.

As described above, the anode electrode of the organic light emitting diode OLED is reset to the reset voltage VAR in both the stress period of the anode reset frame and the sampling period of the refresh frame.

As a result, in the organic light emitting display device according to the exemplary embodiment of the present disclosure, the anode electrode of the organic light emitting diode OLED may be periodically reset during the refresh frame and the reset frame. Accordingly, the consistent rising of the voltage of the anode electrode of the organic light emitting diode OLED due to the leakage current is suppressed even in the driving at a low frequency so that the anode electrode of the organic light emitting diode OLED may maintain a constant voltage level. Accordingly, even though the driving frequency is switched to a low frequency, the luminance variance of the organic light emitting display device is reduced so that the image quality may be increased.

Through FIGS. 2 to 4D, a circuit driving method of each pixel of odd row has described. A circuit driving method of each pixel of an even row is the same as each pixel of an odd row except for an odd-numbered second scan signal SC2_Odd(n). In each pixel of an even row, an even-numbered second scan signal SC2_Even(n) is supplied instead of the odd-numbered second scan signal SC2_Odd(n).

Figure 5:
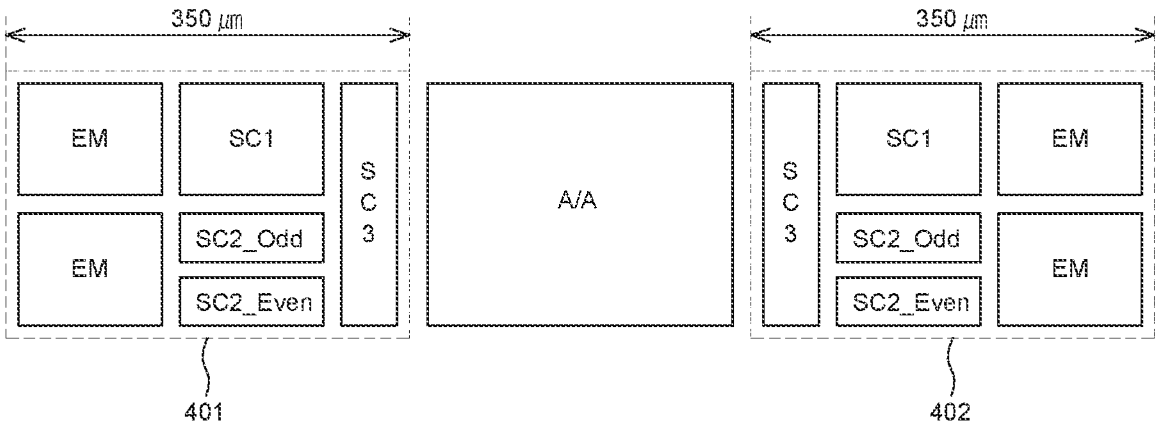
FIG. 5 is a view illustrating a gate driver of an organic light emitting display device according to an exemplary embodiment of the present disclosure.

FIG. 5 is a view illustrating a gate driver of an organic light emitting display device according to an exemplary embodiment of the present disclosure.

For example, in order to apply the on bias stress to the driving transistor, in the organic light emitting display device, a separate stage which swings an initialization voltage may be included in the gate driver to increase the initialization voltage from a low level to a high level even in one frame. In this case, in order to apply the on bias stress to the gate driver, the organic light emitting display device includes a separate stage which swings the initialization voltage, which results in the increase of the bezel and when the separate stage is driven, the power consumption may also be increased.

However, the organic light emitting display device according to the exemplary embodiment of the present disclosure uses a high level of data voltage Vdata to apply the on bias stress to the driving transistor T1. Accordingly, the organic light emitting display device according to the exemplary embodiment of the present disclosure does not need to include a separate stage which swings the initialization voltage in the gate driver to apply the on bias stress.

Therefore, as illustrated in FIG. 5, both the first gate driver 401 disposed at the left side of the display area A/A and the second gate driver 402 disposed at the right side of the display area A/A include only two emission signal stages EM, a first scan signal stage SC1, an odd-numbered second scan signal stage SC2_Odd, an even-numbered second scan signal stage SC2_Even, and a third scan signal stage SC3. However, the first gate driver 401 and the second gate driver 402 may not include a separate stage which swings the initialization voltage to apply the on bias stress.

Accordingly, a width of each of the first gate driver 401 and the second gate driver 402 may be reduced from 400 μm to 350 μm so that the width of the bezel may be reduced. Further, there is no need to drive a separate stage for applying the on bias stress, so that the power consumption may also be reduced.

Additionally, in the organic light emitting display device according to the exemplary embodiment of the present disclosure, there is no need to form a separate stage for applying the on bias stress, so that the manufacturing process yield of the gate driver may be improved.

Hereinafter, an organic light emitting display device according to another exemplary embodiment of the present disclosure will be described. As compared with the organic light emitting display device according to the exemplary embodiment of the present disclosure, the difference of an organic light emitting display device according to another exemplary embodiment of the present disclosure is only the fourth transistor and the initialization voltage, but other technical features are the same.

Another Exemplary Embodiment of Present Disclosure—Example 2

Figure 6:
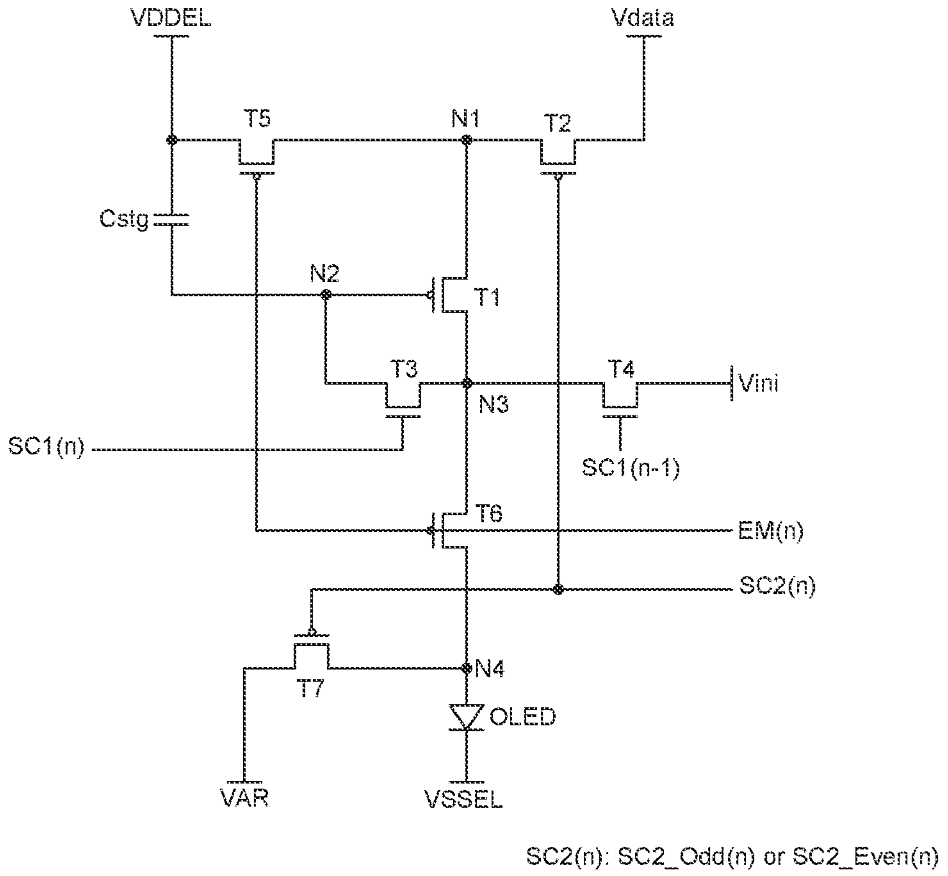
FIG. 6 is a circuit diagram illustrating a pixel of an organic light emitting display device according to another exemplary embodiment of the present disclosure.

FIG. 6 is a circuit diagram illustrating a pixel of an organic light emitting display device according to another exemplary embodiment of the present disclosure.

To be specific, FIG. 6 illustrates each pixel of odd row and a circuit diagram of each pixel of an even row is the same as each pixel of an odd row except for an odd-numbered second scan signal SC2_Odd(n). In each pixel of an even row, an even-numbered second scan signal SC2_Even(n) is supplied instead of the odd-numbered second scan signal SC2_Odd(n).

Each pixel P includes an organic light emitting diode OLED, a driving transistor T1, second to seventh transistors T2 to T7, and a storage capacitor Cstg.

The organic light emitting diode OLED emits light by a driving current supplied from the driving transistor T1. A multilayered organic compound layer is formed between the anode electrode and the cathode electrode of the organic light emitting diode OLED. The organic compound layer includes at least one of a hole transfer layer and an electron transfer layer, and an emission layer EML. Here, the hole transfer layer is a layer which injects or transfers holes to the emission layer and for example, may include a hole injection layer (HIL), a hole transport layer (HTL), and an electron blocking layer (EBL). The electron transfer layer is a layer which injects or transfers the electrons to the emission layer and for example, may include an electron transport layer (ETL), an electron injection layer (EIL), and a hole blocking layer (HBL). An anode electrode of the organic light emitting diode OLED is connected to a fourth node N4 and a cathode electrode of the organic light emitting diode is connected to an input terminal of a low potential driving voltage VSSEL.

The driving transistor T1 controls a driving current applied to the organic light emitting diode OLED in accordance with a source-gate voltage Vsg. The driving transistor T1 may be a p-type MOSFET (PMOS) and a low temperature polycrystalline silicon (LTPS) thin film transistor. A source electrode of the driving transistor T1 is connected to a first node N1, a gate electrode is connected to a second node N2, and a drain electrode is connected to a third node N3. The driving transistor T1 may be referred to as a first transistor.

The second transistor T2 applies a data voltage Vdata supplied from a data line to a first node N1 which is the source electrode of the driving transistor T1. The second transistor T2 may be a p-type MOSFET (PMOS) and a low temperature polycrystalline silicon (LTPS) thin film transistor. The second transistor T2 includes a source electrode connected to the data line, a drain electrode connected to the first node N1, and a gate electrode connected to a second scan signal line which transmits an odd-numbered second scan signal SC2_Odd(n). Accordingly, the second transistor T2 applies a data voltage Vdata supplied from the data line to the first node N1 which is the source electrode of the driving transistor T1, in response to a low level of the odd-numbered second scan signal SC2_Odd(n) which is a turn on level.

The third transistor T3 forms a diode connection between a gate electrode and a drain electrode of the driving transistor T1. The third transistor T3 may be an n-type MOSFET NMOS and an oxide thin film transistor to reduce a leakage current. The third transistor T3 includes a drain electrode connected to the third node N3, a source electrode connected to the second node N2, and a gate electrode connected to a first scan signal line which transmits a first scan signal SC1(*n*). Therefore, the third transistor T3 forms a diode connection between the gate electrode and the drain electrode of the driving transistor T1 in response to a high level of the first scan signal SC1(*n*) which is a turn on level.

The fourth transistor T4 applies an initialization voltage Vini to the third node N3 which is the drain electrode of the driving transistor T1. The fourth transistor T4 may be an n-type MOSFET (NMOS) and an oxide thin film transistor to reduce a leakage current. The fourth transistor T4 includes a source electrode connected to an initialization voltage line which transmits an initialization voltage Vini, a drain electrode connected to the third node N3, and a gate electrode connected to a first scan signal line of a previous stage which transmits a first scan signal SC1(*n*−1) of the previous stage. Accordingly, the fourth transistor T4 applies the initialization voltage Vini to the third node N3 which is the drain electrode of the driving transistor T1, in response to a high level of first scan signal SC1(*n*−1) of the previous stage which is a turn on level.

The fifth transistor T5 applies a high potential driving voltage VDDEL to the first node N1 which is the source electrode of the driving transistor T1. The fifth transistor T5 may be a p-type MOSFET (PMOS) and a low temperature polycrystalline silicon (LTPS) thin film transistor. The fifth transistor T5 includes a source electrode connected to a high potential driving voltage line which transmits a high potential driving voltage VDDEL, a drain electrode connected to the first node N1, and a gate electrode connected to an emission signal line which transmits an emission signal EM(n). Accordingly, the fifth transistor T5 applies the high potential driving voltage VDDEL to the first node N1 which is the source electrode of the driving transistor T1, in response to a low level of emission signal EM(n) which is a turn on level.

The sixth transistor T6 forms a current path between the driving transistor T1 and the organic light emitting diode OLED. The sixth transistor T6 may be a p-type MOSFET (PMOS) and a low temperature polycrystalline silicon (LTPS) thin film transistor. The sixth transistor T6 includes a source electrode connected to the third node N3, a drain electrode connected to the fourth node N4, and a gate electrode connected to the emission signal line which transmits an emission signal EM(n). The sixth transistor T6 forms a current path between the third node N3 which is the source electrode of the sixth transistor T6 and the fourth node N4 which is the drain electrode of the sixth transistor T6, in response to the emission signal EM(n). Accordingly, the sixth transistor T6 forms a current path between the driving transistor T1 and the organic light emitting diode OLED in response to a low level of emission signal EM(n) which is a turn on level.

The seventh transistor T7 applies a reset voltage VAR to the fourth anode N4 which is an anode of the organic light emitting diode. The seventh transistor T7 may be a p-type MOSFET (PMOS) and a low temperature polycrystalline silicon (LTPS) thin film transistor. The seventh transistor T7 includes a source electrode connected to the reset voltage line which transmits the reset voltage VAR, a drain electrode connected to the fourth node N4, and a gate electrode connected to a second scan signal line which transmits an odd-numbered second scan signal SC2_Odd(n). Accordingly, the seventh transistor T7 applies the reset voltage VAR to the fourth node N4 which is the anode of the light emitting diode, in response to a low level of the odd-numbered second scan signal SC2_Odd(n) which is a turn on level.

The storage capacitor Cstg holds a data voltage Vdata stored in each pixel for one frame. The storage capacitor Cstg includes a first electrode connected to the second node N2 and a second electrode connected to the high potential driving voltage line which transmits a high potential driving voltage VDDEL. That is, one electrode of the storage capacitor Cstg is connected to the gate electrode of the driving transistor T1 and the other electrode of the storage capacitor Cstg is connected to the high potential driving voltage line which transmits a high potential driving voltage VDDEL.

Figure 7:
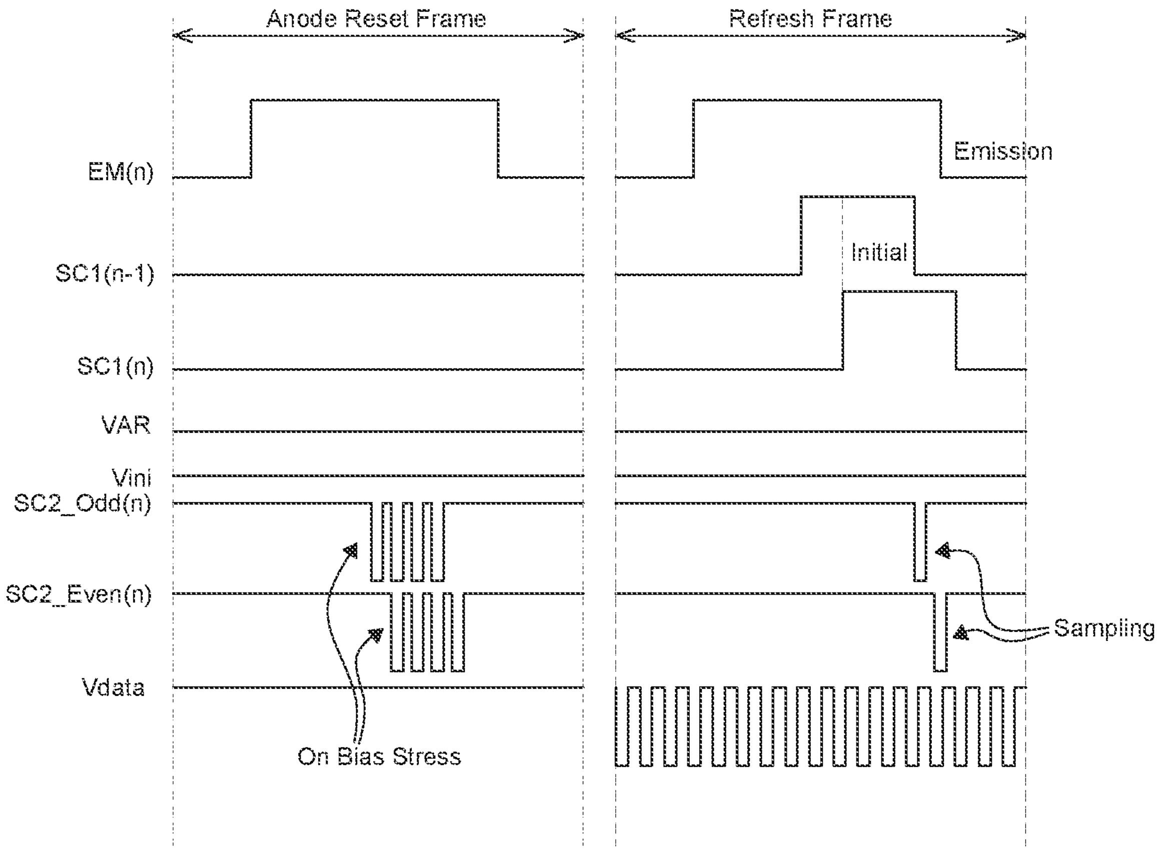
FIG. 7 is a waveform illustrating a signal which is applied to a pixel of an organic light emitting display device during one frame according to another exemplary embodiment of the present disclosure.

FIG. 7 is a waveform illustrating a signal which is applied to a pixel of an organic light emitting display device during one frame according to another exemplary embodiment of the present disclosure.

Figure 8A:
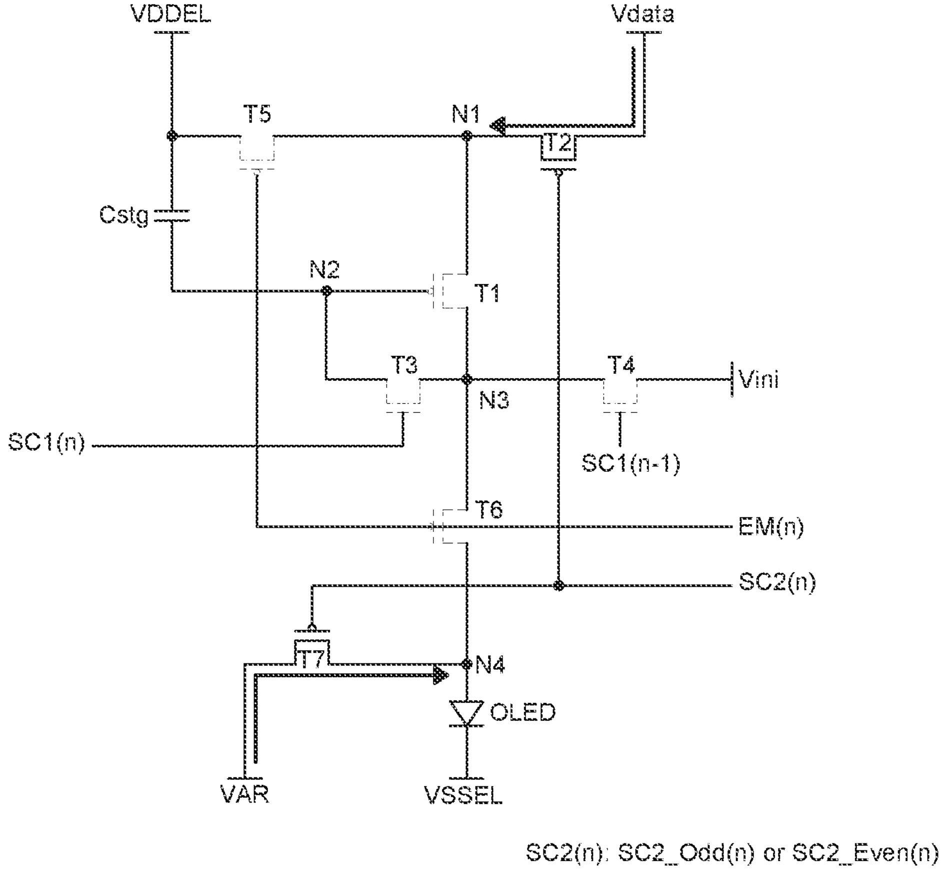
FIG. 8A is a circuit diagram of a pixel of an organic light emitting display device during an on bias stress period according to another exemplary embodiment of the present disclosure.

FIG. 8A is a circuit diagram of a pixel of an organic light emitting display device during an on bias stress period according to another exemplary embodiment of the present disclosure.

Figure 8B:
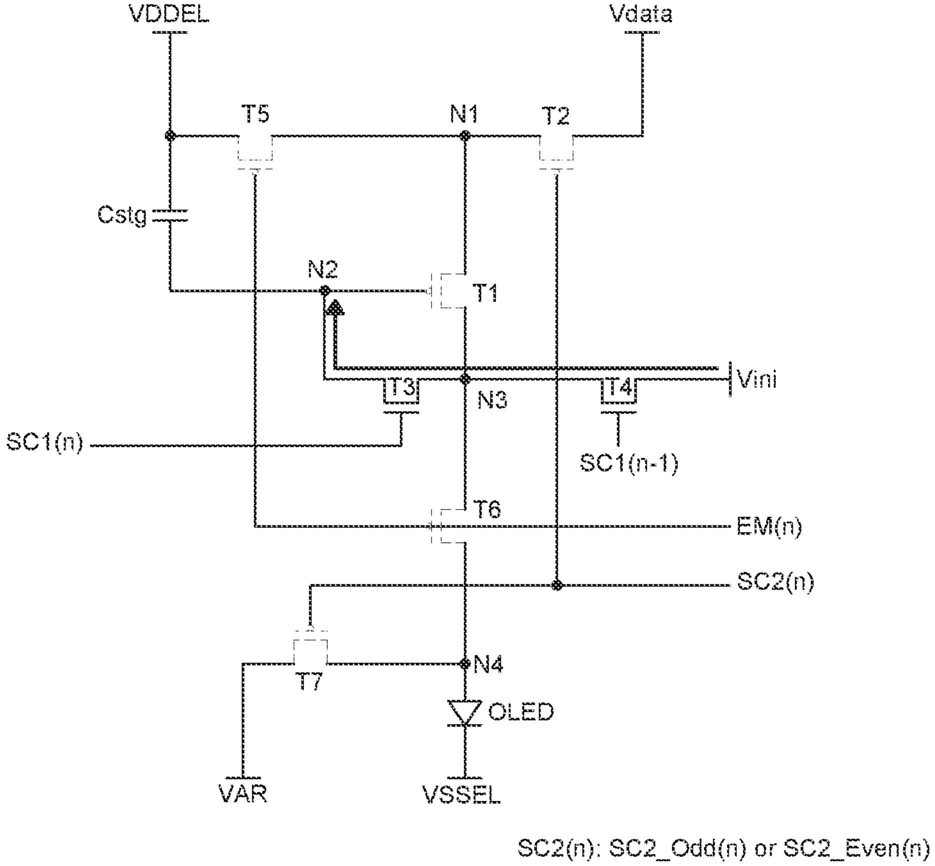
FIG. 8B is a circuit diagram of a pixel of an organic light emitting display device during an initial period according to another exemplary embodiment of the present disclosure.

FIG. 8B is a circuit diagram of a pixel of an organic light emitting display device during an initial period according to another exemplary embodiment of the present disclosure.

Figure 8C:
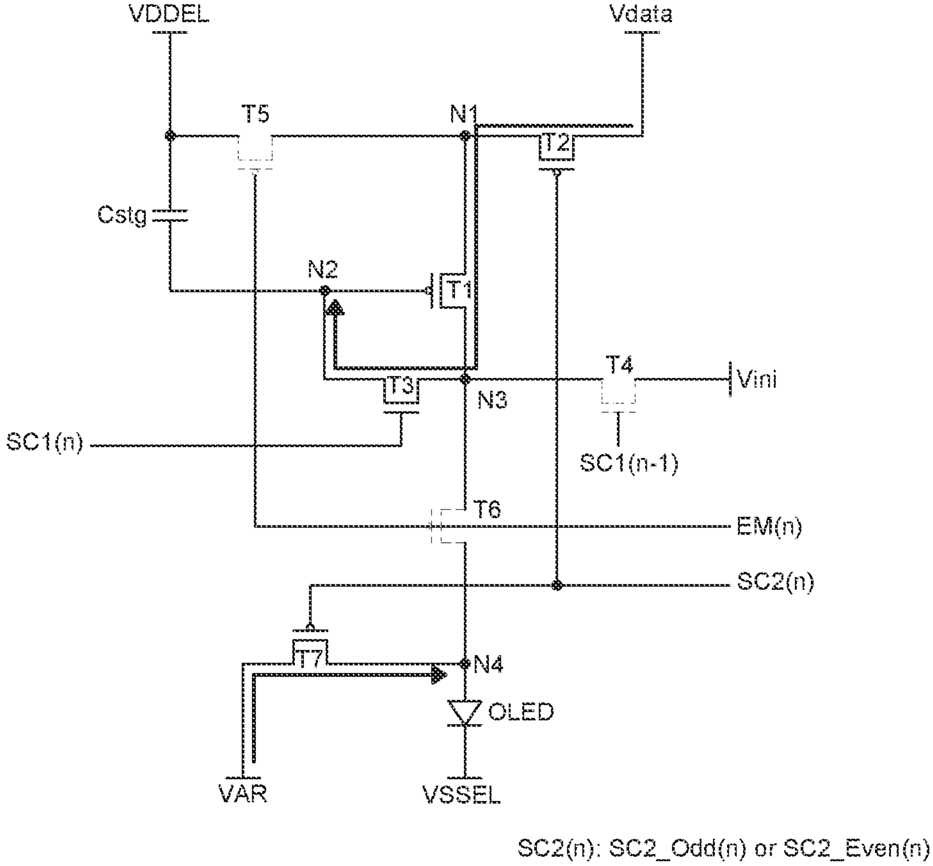
FIG. 8C is a circuit diagram of a pixel of an organic light emitting display device during a sampling period according to another exemplary embodiment of the present disclosure.

FIG. 8C is a circuit diagram of a pixel of an organic light emitting display device during a sampling period according to another exemplary embodiment of the present disclosure.

Figure 8D:
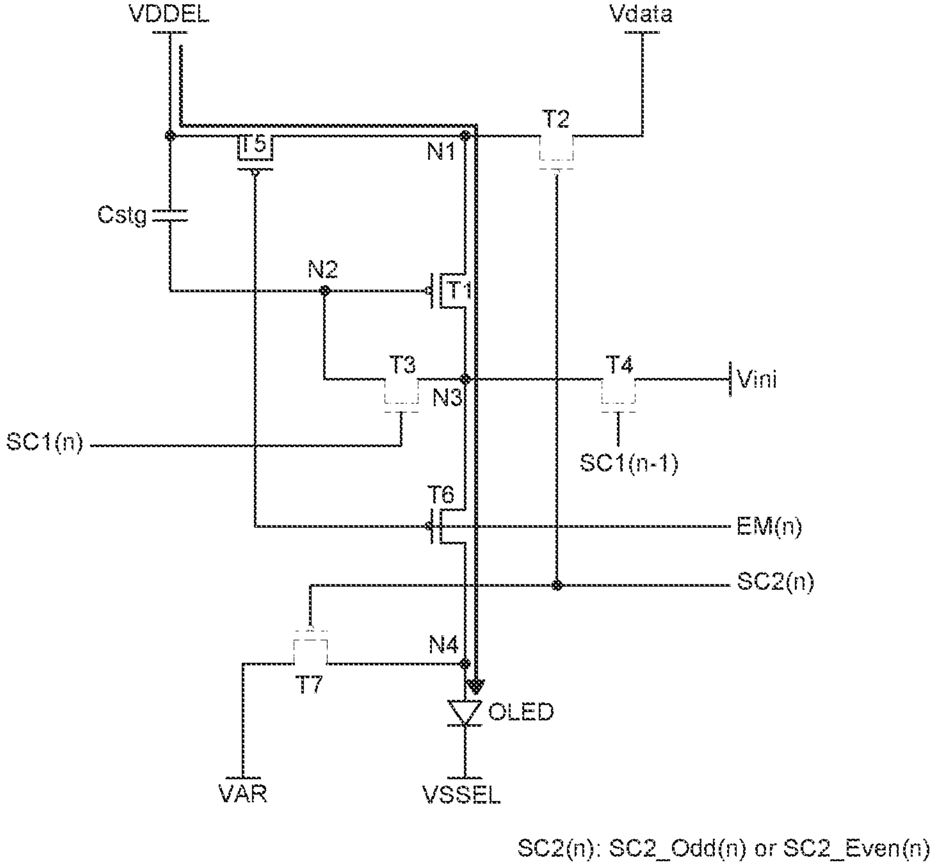
FIG. 8D is a circuit diagram of a pixel of an organic light emitting display device during an emission period according to another exemplary embodiment of the present disclosure.

FIG. 8D is a circuit diagram of a pixel of an organic light emitting display device during an emission period according to another exemplary embodiment of the present disclosure.

The driving of the pixel of the organic light emitting display device according to another exemplary embodiment of the present disclosure will be described with reference to FIGS. 6 to 8D, as follows.

The organic light emitting display device according to another exemplary embodiment of the present disclosure may also be driven to be divided into a refresh frame and an anode reset frame. In the refresh frame, the data voltage Vdata is programmed in each pixel P and the organic light emitting diode OLED emits light. The anode reset frame may be a vertical blank frame and the anode electrode of the organic light emitting diode OLED is reset during the anode reset frame.

In the organic light emitting display device according to another exemplary embodiment of the present disclosure, the anode reset frame may include a plurality of stress periods (on bias stress). The stress period (on bias stress) is a period in which a bias stress is applied to the first node N1 which is the source electrode of the driving transistor T1. Further, during the stress period, the anode electrode of the organic light emitting diode OLED may be reset. Further, as illustrated in FIG. 7, during the anode reset frame, the reset voltage VAR and the initialization voltage Vini are low levels and the data voltage Vdata is a high level.

In the organic light emitting display device according to another exemplary embodiment of the present disclosure, the refresh frame may be divided into an initial period, a sampling period, and an emission period. The initial period is a period in which the voltage of the third node N3 which is the drain electrode of the driving transistor T1 is initialized. The sampling period is a period in which a threshold voltage Vth of the driving transistor T1 is sampled and the data voltage Vdata is programmed. The emission period is a period in which the organic light emitting diode OLED emits light in accordance with the driving current by the source-gate voltage of the programmed driving transistor T1. As illustrated in FIG. 7, during the refresh frame, the reset voltage VAR and the initialization voltage Vini are low levels.

Specifically, referring to FIGS. 7 and 8A, during the stress period (on bias stress) of the anode reset frame, the odd-numbered second scan signal SC2_Odd(n) is a low level which is a turn on level. In other words, in the anode reset frame including a plurality of stress periods (on bias stress), the odd-numbered second scan signal SC2_Odd(n) may have a waveform including a plurality of pulses. In the anode reset frame including a plurality of stress periods (on bias stress), the data voltage Vdata is always a high level.

Therefore, the seventh transistor T7 is turned on to apply the reset voltage VAR to the fourth node N4. That is, the anode electrode of the organic light emitting diode OLED is reset to the reset voltage VAR.

Therefore, the second transistor T2 is turned on to apply a high level of data voltage Vdata to the first node N1. The high level of data voltage Vdata may be selected in a voltage range which is sufficiently higher than an operating voltage of the organic light emitting diode OLED and may be set to a voltage equal to or less than a high potential driving voltage VDDEL. That is, during the stress period (on bias stress), the on bias stress is applied to the first node N1 which is the source electrode of the driving transistor T1 to drop the gate-source voltage Vgs of the driving transistor T1. Accordingly, during the stress period (on bias stress), the source-drain current Ids of the driving transistor T1 flows to relieve the hysteresis of the driving transistor T1.

Referring to FIGS. 7 and 8B, during an initial period of the refresh frame, the first scan signal SC1(*n*) is a high level which is a turn on level and the first scan signal SC1(*n*−1) of the previous stage is a high level which is a turn on level. Therefore, the third transistor T3 and the fourth transistor T4 are turned on to apply the initialization voltage Vini to the third node N3 and the second node N2. As a result, the gate electrode and the drain electrode of the driving transistor T1 are initialized to the initialization voltage Vini. In the refresh frame, the initialization voltage Vini may be selected in a voltage range which is sufficiently less than an operating voltage of the organic light emitting diode OLED and may be set to a voltage equal to or less than a low potential driving voltage VSSEL.

Referring to FIGS. 7 and 8C, during a sampling period of the refresh frame, the first scan signal SC1(*n*) is a high level which is a turn on level and the odd-numbered second scan signal SC2_Odd(n) is a low level which is a turn on level. During the sampling period of the refresh frame, the first scan signal SC1(*n*) is a high level which is a turn on level, an odd-numbered second scan signal SC2_Odd(n) is a low level which is a turn on level, and an even-numbered second scan signal SC2_Even(n) is a low level which is a turn on level. In FIG. 7, in the refresh frame, the odd-numbered second scan signal SC2_Odd(n) is illustrated by a waveform including one pulse. However, the present disclosure is not limited thereto and the odd-numbered second scan signal SC2_Odd(n) may have a waveform including a plurality of pulses.

Therefore, during the sampling period, the second transistor T2 is turned on so that the data voltage Vdata is applied to the first node N1. Further, the third transistor T3 is also turned on so that the driving transistor T1 is diode-connected. Therefore, the gate electrode and the drain electrode of the driving transistor T1 are shorted so that the driving transistor T1 operates as a diode. During the sampling period, a current Ids flows between the source and the drain of the driving transistor T1. The gate electrode and the drain electrode of the driving transistor T1 are diode-connected, so that the voltage of the second node N2 rises by the current flowing from the source electrode to the drain electrode until the gate-source voltage Vgs of the driving transistor T1 becomes Vth. During the sampling period, the voltage of the second node N2 is charged with a voltage Vdata−|Vth| corresponding to the difference between the data voltage Vdata and the threshold voltage Vth of the driving transistor T1.

Further, during the sampling period of the refresh frame, the odd-numbered second scan signal SC2_Odd(n) is a low level which is a turn on level, so that the seventh transistor T7 is turned on to apply the reset voltage VAR to the fourth node N4. That is, the anode electrode of the organic light emitting diode OLED is reset to the reset voltage VAR.

Further, in the refresh frame, when the odd-numbered second scan signal SC2_Odd(n) has a waveform including a plurality of pulses, the second transistor T2 is turned on to apply the data voltage Vdata to the first node N1. Therefore, also in the refresh frame, the bias stress is applied to the first node N1 which is the source electrode of the driving transistor T1 to relieve the hysteresis of the driving transistor T1.

Referring to FIGS. 7 and 8D, during the emission period of the refresh frame, the emission signal EM(n) is a low level which is a turn on level. Therefore, the fifth transistor T5 is turned on to apply the high potential driving voltage VDDEL to the first node N1. The sixth transistor T6 is also turned on to form a current path of the third node N3 and the fourth node N4. As a result, a driving current Ioled passing through the source electrode and the drain electrode of the driving transistor T1 is applied to the organic light emitting diode OLED.

A relational expression of the driving current Ioled flowing through the organic light emitting diode OLED during the emission period is represented by the above-described Equation 1.

As seen from Equation 1, it is understood that in the relational expression of the driving current Ioled, a component of the threshold voltage Vth of the driving transistor T1 is eliminated so that even though in the display device of the present disclosure, the threshold voltage Vth changes, the driving current Ioled does not change. As described above, the display device of the present disclosure may program the data voltage regardless of the variation of the threshold voltage Vth during the sampling period.

As described above, the anode electrode of the organic light emitting diode OLED is reset to the reset voltage VAR in both the stress period of the anode reset frame and the sampling period of the refresh frame.

As a result, also in the organic light emitting display device according to another exemplary embodiment of the present disclosure, the anode electrode of the organic light emitting diode OLED may be periodically reset during the refresh frame and the reset frame. Accordingly, the consistent rising of the voltage of the anode electrode of the organic light emitting diode OLED due to the leakage current is suppressed even in the driving at a low frequency so that the anode electrode of the organic light emitting diode OLED may maintain a constant voltage level. Accordingly, even though the driving frequency is switched to a low frequency, the luminance variance of the organic light emitting display device is reduced so that the image quality may be increased.

Through FIGS. 6 to 8D, a circuit driving method of each pixel of an odd row has been described. A circuit driving method of each pixel of an even row is the same as each pixel of an odd row except for an odd-numbered second scan signal SC2_Odd(n). In each pixel of an even row, an even-numbered second scan signal SC2_Even(n) is supplied instead of the odd-numbered second scan signal SC2_Odd (n).

Figure 9:
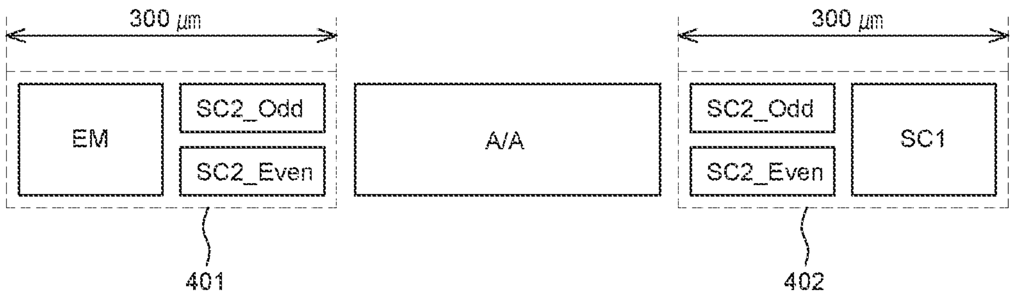
FIG. 9 is a view illustrating a gate driver of an organic light emitting display device according to another exemplary embodiment of the present disclosure.

FIG. 9 is a view illustrating a gate driver of an organic light emitting display device according to another exemplary embodiment of the present disclosure.

The organic light emitting display device according to another exemplary embodiment of the present disclosure uses a high level of data voltage Vdata to apply the on bias stress to the driving transistor T1. Accordingly, the organic light emitting display device according to another exemplary embodiment of the present disclosure does not need to include a separate stage which swings the initialization voltage in the gate driver to apply the on bias stress.

Moreover, as illustrated in FIG. 9, the first gate driver 401 disposed at the left side of the display area A/A includes only the emission signal stage EM, an off-numbered second scan signal stage SC2 Odd and an even-numbered second scan signal stage SC2 Even, and the second gate driver 402 disposed at the right side of the display area A/A includes only a first scan signal stage SC1, an odd-numbered second scan signal stage SC2_Odd and an even-numbered second scan signal stage SC2_Even. However, the first gate driver 401 and the second gate driver 402 may not include a third scan signal stage.

Accordingly, a width of each of the first gate driver 401 and the second gate driver 402 may be reduced from 350 μm to 300 μm as compared with the organic light emitting display device according to the exemplary embodiment of the present disclosure so that the width of the bezel may be further reduced. Further, there is no need to drive a third scan signal stage, so that the power consumption may also be reduced.

Hereinafter, an organic light emitting display device according to still another exemplary embodiment (Example 3) of the present disclosure will be described. Only difference between an organic light emitting display device according to still another exemplary embodiment (Example 3) of the present disclosure and the organic light emitting display device according to the exemplary embodiment of the present disclosure is a drain electrode connection relationship of the fourth transistor. Other technical features are the same. Therefore, a signal applied to a pixel of the organic light emitting display device according to still another exemplary embodiment (Example 3) of the present disclosure and a signal applied to a pixel of the organic light emitting display device according to the exemplary embodiment of the present disclosure are the same. Therefore, the organic light emitting display device according to still another exemplary embodiment (Example 3) of the present disclosure will be described using a waveform of FIG. 3.

Still Another Exemplary Embodiment of Present Disclosure—Example 3

Figure 10:
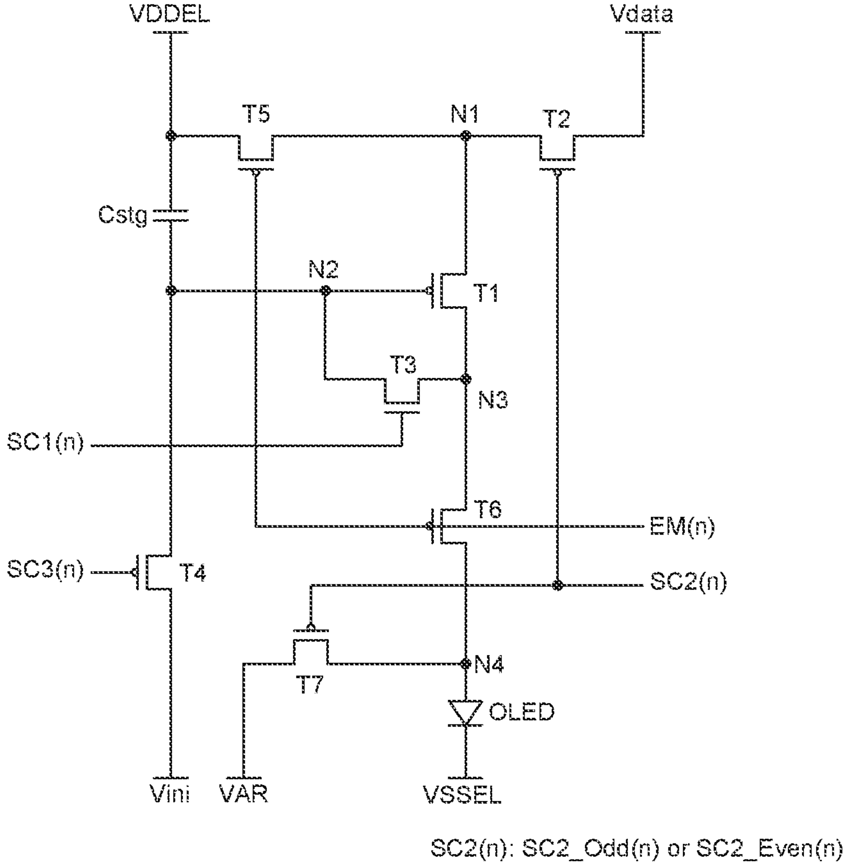
FIG. 10 is a circuit diagram illustrating a pixel of an organic light emitting display device according to still another exemplary embodiment of the present disclosure.

FIG. 10 is a circuit diagram illustrating a pixel of an organic light emitting display device according to still another exemplary embodiment (Example 3) of the present disclosure.

To be specific, FIG. 10 illustrates each pixel of odd row and a circuit diagram of each pixel of an even row is the same as each pixel of an odd row except for an odd-numbered second scan signal SC2_Odd(n). In each pixel of an even row, an even-numbered second scan signal SC2_Even(n) is supplied instead of the odd-numbered second scan signal SC2_Odd(n).

Each pixel P includes an organic light emitting diode OLED, a driving transistor T1, second to seventh transistors T2 to T7, and a storage capacitor Cstg.

The organic light emitting diode OLED emits light by a driving current supplied from the driving transistor T1. A multilayered organic compound layer is formed between the anode electrode and the cathode electrode of the organic light emitting diode OLED. The organic compound layer includes at least one of a hole transfer layer and an electron transfer layer, and an emission layer (EML). Here, the hole transfer layer is a layer which injects or transfers holes to the emission layer and for example, may include a hole injection layer (HIL), a hole transport layer (HTL), and an electron blocking layer (EBL). The electron transfer layer is a layer which injects or transfers the electrons to the emission layer and for example, may include an electron transport layer (ETL), an electron injection layer (EIL), and a hole blocking layer (HBL). An anode electrode of the organic light emitting diode OLED is connected to a fourth node N4 and a cathode electrode of the organic light emitting diode is connected to an input terminal of a low potential driving voltage VSSEL.

The driving transistor T1 controls a driving current applied to the organic light emitting diode OLED in accordance with a source-gate voltage Vsg. The driving transistor T1 may be a p-type MOSFET (PMOS) and a low temperature polycrystalline silicon (LTPS) thin film transistor. A source electrode of the driving transistor T1 is connected to a first node N1, a gate electrode is connected to a second node N2, and a drain electrode is connected to a third node N3. The driving transistor T1 may be referred to as a first transistor.

The second transistor T2 applies a data voltage Vdata supplied from a data line to a first node N1 which is the source electrode of the driving transistor T1. The second transistor T2 may be a p-type MOSFET (PMOS) and a low temperature polycrystalline silicon (LTPS) thin film transistor. The second transistor T2 includes a source electrode connected to the data line, a drain electrode connected to the first node N1, and a gate electrode connected to a second scan signal line which transmits an odd-numbered second scan signal SC2_Odd(n). Accordingly, the second transistor T2 applies a data voltage Vdata supplied from the data line to the first node N1 which is the source electrode of the driving transistor T1, in response to a low level of the odd-numbered second scan signal SC2_Odd(n) which is a turn on level.

The third transistor T3 forms a diode connection between a gate electrode and a drain electrode of the driving transistor T1. The third transistor T3 may be an n-type MOSFET NMOS and an oxide thin film transistor to reduce a leakage current. The third transistor T3 includes a drain electrode connected to the third node N3, a source electrode connected to the second node N2, and a gate electrode connected to a first scan signal line which transmits a first scan signal SC1(*n*). Therefore, the third transistor T3 forms a diode connection between the gate electrode and the drain electrode of the driving transistor T1 in response to the first scan signal SC1(*n*) of a high level which is a turn on level.

The fourth transistor T4 applies an initialization voltage Vini to the second node N2 which is the gate electrode of the driving transistor T1. The fourth transistor T4 may be a p-type MOSFET (PMOS) and a low temperature polycrystalline silicon (LTPS) thin film transistor. The fourth transistor T4 includes a source electrode connected to an initialization voltage line which transmits an initialization voltage Vini, a drain electrode connected to the second node N2, and a gate electrode connected to a third scan signal line which transmits a third scan signal SC3(*n*). Accordingly, the fourth transistor T4 applies the initialization voltage Vini to the second node N2 which is the gate electrode of the driving transistor T1, in response to a low level of third scan signal SC3(*n*) which is a turn on level.

The fifth transistor T5 applies a high potential driving voltage VDDEL to the first node N1 which is the source electrode of the driving transistor T1. The fifth transistor T5 may be a p-type MOSFET (PMOS) and a low temperature polycrystalline silicon (LTPS) thin film transistor. The fifth transistor T5 includes a source electrode connected to a high potential driving voltage line which transmits a high potential driving voltage VDDEL, a drain electrode connected to the first node N1, and a gate electrode connected to an emission signal line which transmits an emission signal EM(n). Accordingly, the fifth transistor T5 applies the high potential driving voltage VDDEL to the first node N1 which is the source electrode of the driving transistor T1, in response to a low level of emission signal EM(n) which is a turn on level.

The sixth transistor T6 forms a current path between the driving transistor T1 and the organic light emitting diode OLED. The sixth transistor T6 may be a p-type MOSFET (PMOS) and a low temperature polycrystalline silicon (LTPS) thin film transistor. The sixth transistor T6 includes a source electrode connected to the third node N3, a drain electrode connected to the fourth node N4, and a gate electrode connected to the emission signal line which transmits an emission signal EM(n). The sixth transistor T6 forms a current path between the third node N3 which is the source electrode of the sixth transistor T6 and the fourth node N4 which is the drain electrode of the sixth transistor T6, in response to the emission signal EM(n). Accordingly, the sixth transistor T6 forms a current path between the driving transistor T1 and the organic light emitting diode OLED in response to a low level of emission signal EM(n) which is a turn on level.

The seventh transistor T7 applies a reset voltage VAR to the fourth anode N4 which is an anode of the organic light emitting diode. The seventh transistor T7 may be a p-type MOSFET (PMOS) and a low temperature polycrystalline silicon (LTPS) thin film transistor. The seventh transistor T7 includes a source electrode connected to the reset voltage line which transmits the reset voltage VAR, a drain electrode connected to the fourth node N4, and a gate electrode connected to a second scan signal line which transmits an odd-numbered second scan signal SC2_Odd(n)). Accordingly, the seventh transistor T7 applies the reset voltage VAR to the fourth node N4 which is the anode of the organic light emitting diode, in response to a low level of the odd-numbered second scan signal SC2_Odd(n) which is a turn on level.

The storage capacitor Cstg holds a data voltage Vdata stored in each pixel for one frame. The storage capacitor Cstg includes a first electrode connected to the second node N2 and a second electrode connected to the high potential driving voltage line which transmits a high potential driving voltage VDDEL. That is, one electrode of the storage capacitor Cstg is connected to the gate electrode of the driving transistor T1 and the other electrode of the storage capacitor Cstg is connected to the high potential driving voltage line which transmits a high potential driving voltage VDDEL.

Figure 11A:
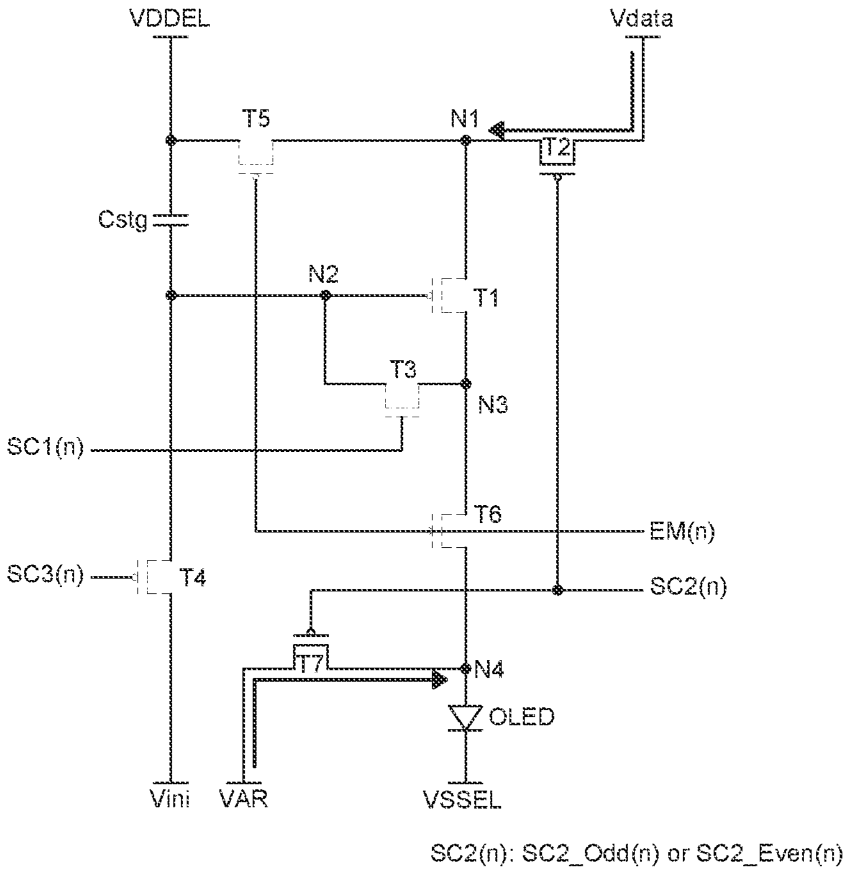
FIG. 11A is a circuit diagram of a pixel of an organic light emitting display device during an on bias stress period according to still another exemplary embodiment of the present disclosure.

FIG. 11A is a circuit diagram of a pixel of an organic light emitting display device during an on bias stress period according to still another exemplary embodiment (Example 3) of the present disclosure.

Figure 11B:
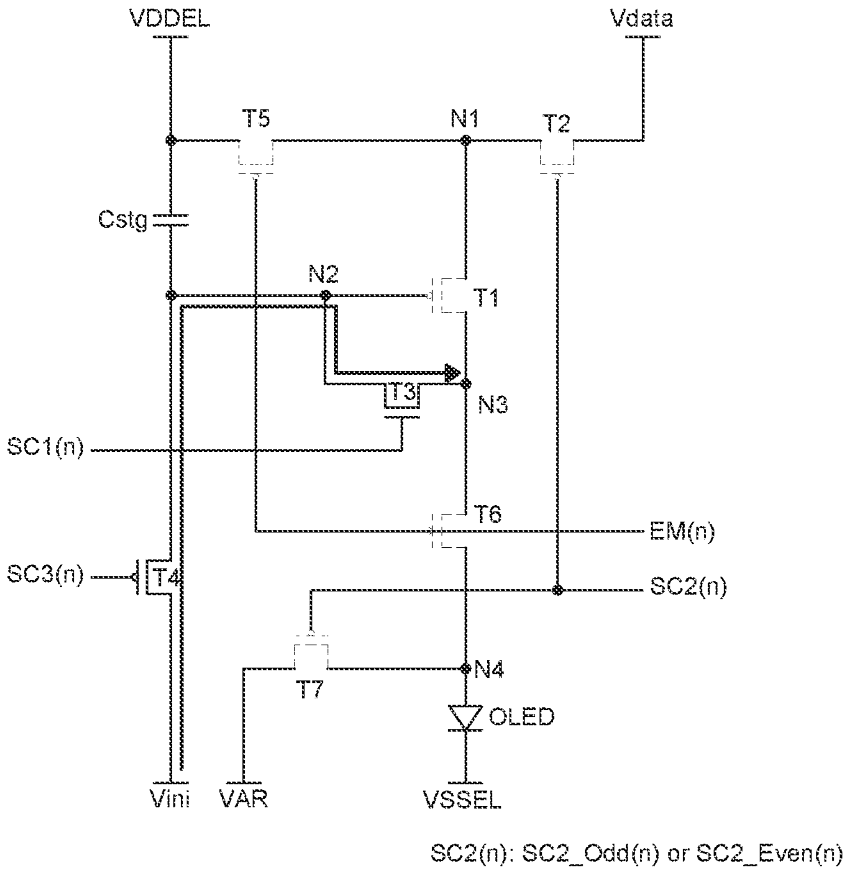
FIG. 11B is a circuit diagram of a pixel of an organic light emitting display device during an initial period according to still another exemplary embodiment of the present disclosure.

FIG. 11B is a circuit diagram of a pixel of an organic light emitting display device during an initial period according to still another exemplary embodiment (Example 3) of the present disclosure.

Figure 11C:
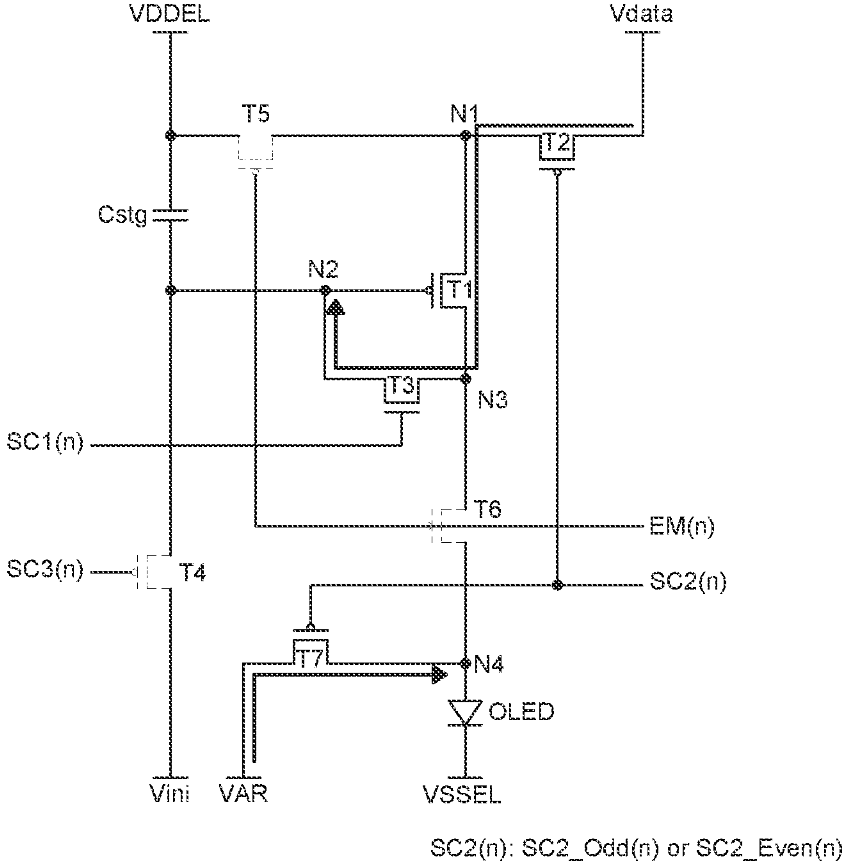
FIG. 11C is a circuit diagram of a pixel of an organic light emitting display device during a sampling period according to still another exemplary embodiment (Example 3) of the present disclosure.

FIG. 11C is a circuit diagram of a pixel of an organic light emitting display device during a sampling period according to still another exemplary embodiment (Example 3) of the present disclosure.

Figure 11D:
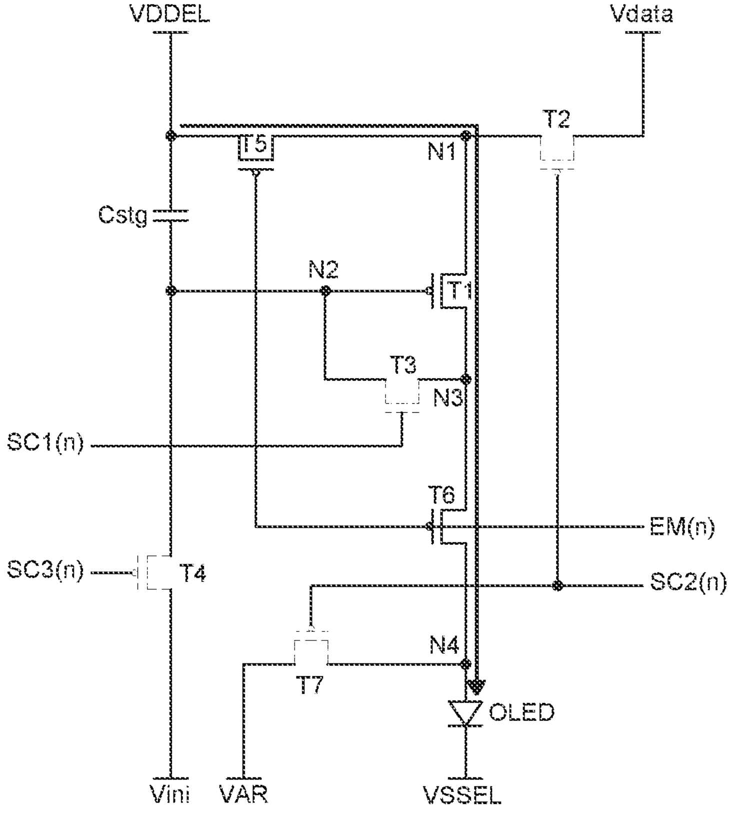
FIG. 11D is a circuit diagram of a pixel of an organic light emitting display device during an emission period according to still another exemplary embodiment (Example 3) of the present disclosure.

FIG. 11D is a circuit diagram of a pixel of an organic light emitting display device during an emission period according to still another exemplary embodiment (Example 3) of the present disclosure.

The driving of the pixel of the organic light emitting display device according to still another exemplary embodiment (Example 3) of the present disclosure will be described with reference to FIGS. 10 to 11D, as follows.

The organic light emitting display device according to still another exemplary embodiment (Example 3) of the present disclosure may be driven to be divided into a refresh frame and an anode reset frame. In the refresh frame, the data voltage Vdata is programmed in each pixel P and the organic light emitting diode OLED emits light. The anode reset frame may be a vertical blank frame and the anode electrode of the organic light emitting diode OLED is reset during the anode reset frame.

In the organic light emitting display device according to still another exemplary embodiment (Example 3) of the present disclosure, the anode reset frame may include a plurality of stress periods (on bias stress). The stress period (on bias stress) is a period in which a bias stress is applied to the first node N1 which is the source electrode of the driving transistor T1. Further, during the stress period, the anode electrode of the organic light emitting diode OLED may be reset. Further, as illustrated in FIG. 3, during the anode reset frame, the reset voltage VAR is a low level and the initialization voltage Vini and the data voltage Vdata are high levels.

In the organic light emitting display device according to still another exemplary embodiment (Example 3) of the present disclosure, the refresh frame may be divided into an initial period, a sampling period, and an emission period. The initial period is a period in which the voltage of the second node N2 which is the gate electrode of the driving transistor T1 is initialized. The sampling period is a period in which a threshold voltage Vth of the driving transistor T1 is sampled and the data voltage Vdata is programmed. The emission period is a period in which the organic light emitting diode OLED emits light in accordance with the driving current by the source-gate voltage of the programmed driving transistor T1. As illustrated in FIG. 3, during the refresh frame, the reset voltage VAR and the initialization voltage Vini are low levels.

Specifically, referring to FIGS. 3 and 11A, during the stress period (on bias stress) of the anode reset frame, the odd-numbered second scan signal SC2_Odd(n) is a low level which is a turn on level. In other words, in the anode reset frame including a plurality of stress periods (on bias stress), the odd-numbered second scan signal SC2_Odd(n) may have a waveform including a plurality of pulses. In the anode reset frame including a plurality of stress periods (on bias stress), the data voltage Vdata is always a high level.

Therefore, the seventh transistor T7 is turned on to apply the reset voltage VAR to the fourth node N4. That is, the anode electrode of the organic light emitting diode OLED is reset to the reset voltage VAR.

Therefore, the second transistor T2 is turned on to apply a high level of data voltage Vdata to the first node N1. The high level of data voltage Vdata may be selected in a voltage range which is sufficiently higher than an operating voltage of the organic light emitting diode OLED and may be set to a voltage equal to or less than a high potential driving voltage VDDEL. That is, during the stress period (on bias stress), the on bias stress is applied to the first node N1 which is the source electrode of the driving transistor T1 to drop the gate-source voltage Vgs of the driving transistor T1. Accordingly, during the stress period (on bias stress), the source-drain current Ids of the driving transistor T1 flows to relieve the hysteresis of the driving transistor T1.

In the anode reset frame, the initialization voltage Vini may be a high level. Therefore, a high level of third scan signal SC3(*n*) is applied to the gate electrode of the fourth transistor T4 and a high level of initialization voltage Vini is applied to the source electrode of the fourth transistor T4 so that a potential difference between the gate electrode and the source electrode of the fourth transistor T4 may be reduced. Accordingly, during the anode reset frame, the leakage current of the fourth transistor T4 may be reduced.

Referring to FIGS. 3 and 11B, during an initial period of the refresh frame, the first scan signal SC1(*n*) is a high level which is a turn on level and the third scan signal SC3(*n*) is a low level which is a turn on level. Therefore, the third transistor T3 and the fourth transistor T4 are turned on to apply the initialization voltage Vini to the third node N3 and the second node N2. As a result, the gate electrode and the drain electrode of the driving transistor T1 are initialized to the initialization voltage Vini. In the refresh frame, the initialization voltage Vini may be selected in a voltage range which is sufficiently less than an operating voltage of the organic light emitting diode OLED and may be set to a voltage equal to or less than a low potential driving voltage VSSEL.

Referring to FIGS. 3 and 11C, during a sampling period of the refresh frame, the first scan signal SC1(*n*) is a high level which is a turn on level and the odd-numbered second scan signal SC2_Odd(n) is a low level which is a turn on level. During the sampling period of the refresh frame, the first scan signal SC1(*n*) is a high level which is a turn on level, an odd-numbered second scan signals SC2_Odd(n) is a low level which is a turn on level, and an even-numbered second scan signal SC2_Even(n) is a low level which is a turn on level. In FIG. 3, in the refresh frame, the odd-numbered second scan signals SC2_Odd(n) are illustrated by a waveform including one pulse. However, the present disclosure is not limited thereto and the odd-numbered second scan signal SC2_Odd(n) may have a waveform including a plurality of pulses.

Therefore, during the sampling period, the second transistor T2 is turned on so that the data voltage Vdata is applied to the first node N1. Further, the third transistor T3 is also turned on so that the driving transistor T1 is diode-connected. Therefore, the gate electrode and the drain electrode of the driving transistor T1 are shorted so that the driving transistor T1 operates as a diode. During the sampling period, a current Ids flows between the source and the drain of the driving transistor T1. The gate electrode and the drain electrode of the driving transistor T1 are diode-connected, so that the voltage of the second node N2 rises by the current flowing from the source electrode to the drain electrode until the gate-source voltage Vgs of the driving transistor T1 becomes Vth. During the sampling period, the voltage of the second node N2 is charged with a voltage Vdata−|Vth| corresponding to the difference between the data voltage Vdata and the threshold voltage Vth of the driving transistor T1.

Further, during the sampling period of the refresh frame, the odd-numbered second scan signal SC2_Odd(n) is a low level which is a turn on level, so that the seventh transistor T7 is turned on to apply the reset voltage VAR to the fourth node N4. That is, the anode electrode of the organic light emitting diode OLED is reset to the reset voltage VAR.

Further, in the refresh frame, when the odd-numbered second scan signal SC2_Odd(n) has a waveform including a plurality of pulses, the second transistor T2 is turned on to apply the data voltage Vdata to the first node N1. Therefore, also in the refresh frame, the bias stress is applied to the first node N1 which is the source electrode of the driving transistor T1 to relieve the hysteresis of the driving transistor T1.

Referring to FIGS. 3 and 11D, during the emission period of the refresh frame, the emission signal EM(n) is a low level which is a turn on level. Therefore, the fifth transistor T5 is turned on to apply the high potential driving voltage VDDEL to the first node N1. The sixth transistor T6 is also turned on to form a current path of the third node N3 and the fourth node N4. As a result, a driving current Ioled passing through the source electrode and the drain electrode of the driving transistor T1 is applied to the organic light emitting diode OLED.

A relational expression of the driving current Ioled flowing through the organic light emitting diode OLED during the emission period is represented by the above-described Equation 1.

As seen from Equation 1, it is understood that in the relational expression of the driving current Ioled, a component of the threshold voltage Vth of the driving transistor T1 is eliminated so that even though in the display device of the present disclosure, the threshold voltage Vth changes, the driving current Ioled does not change. As described above, the display device of the present disclosure may program the data voltage regardless of the variation of the threshold voltage Vth during the sampling period.

As described above, the anode electrode of the organic light emitting diode OLED is reset to the reset voltage VAR in both the stress period of the anode reset frame and the sampling period of the refresh frame.

Through FIGS. 10 to 11D, a circuit driving method of each pixel of an odd row has described. A circuit driving method of each pixel of an even row is the same as each pixel of an odd row except for an odd-numbered second scan signal SC2_Odd(n). In each pixel of an even row, an even-numbered second scan signal SC2_Even(n) is supplied instead of the odd-numbered second scan signal SC2_Odd (n).

As a result, in the organic light emitting display device according to still another exemplary embodiment (Example 3) of the present disclosure, the anode electrode of the organic light emitting diode OLED may be periodically reset during the refresh frame and the reset frame. Accordingly, the consistent rising of the voltage of the anode electrode of the organic light emitting diode OLED due to the leakage current is suppressed even in the driving at a low frequency so that the anode electrode of the organic light emitting diode OLED may maintain a constant voltage level. Accordingly, even though the driving frequency is switched to a low frequency, the luminance variance of the organic light emitting display device is reduced so that the image quality may be increased.

In addition, the organic light emitting display device according to still another exemplary embodiment (Example 3) of the present disclosure uses a high level of data voltage Vdata to apply the on bias stress to the driving transistor T1. Accordingly, the organic light emitting display device according to still another exemplary embodiment (Example 3) of the present disclosure does not need to include a separate stage which swings the initialization voltage in the gate driver to apply the on bias stress.

Therefore, as illustrated in FIG. 5, both the first gate driver 401 disposed at the left side of the display area A/A and the second gate driver 402 disposed at the right side of the display area A/A include only two emission signal stages EM, a first scan signal stage SC1, an odd-numbered second scan signal stage SC2_Odd, an even-numbered second scan signal stage SC2_Even, and a third scan signal stage SC3. However, the first gate driver 401 and the second gate driver 402 may not include a separate stage which swings the initialization voltage to apply the on bias stress.

Accordingly, a width of each of the first gate driver 401 and the second gate driver 402 may be reduced from 400 μm to 350 μm so that the width of the bezel may be reduced. Further, there is no need to drive a separate stage for applying the on bias stress, so that the power consumption may also be reduced.

Additionally, the organic light emitting display device according to still another exemplary embodiment (Example 3) of the present disclosure, there is no need to form a separate stage for the on bias stress, so that the manufacturing process yield of the gate driver may be improved.

Hereinafter, an organic light emitting display device according to still another exemplary embodiment (Example 4) of the present disclosure will be described. As compared with the organic light emitting display device according to still another exemplary embodiment (Example 3) of the present disclosure, the difference of an organic light emitting display device according to still another exemplary embodiment (Example 4) of the present disclosure is only the fourth transistor and the initialization voltage, but other technical features are the same. Therefore, a signal applied to a pixel of the organic light emitting display device according to still another exemplary embodiment (Example 4) of the present disclosure and a signal applied to a pixel of the organic light emitting display device according to another exemplary embodiment (Example 2) of the present disclosure are the same. Therefore, the organic light emitting display device according to still another exemplary embodiment (Example 4) of the present disclosure will be described using a waveform of FIG. 7.

Still Another Exemplary Embodiment of Present Disclosure—Example 4

Figure 12:
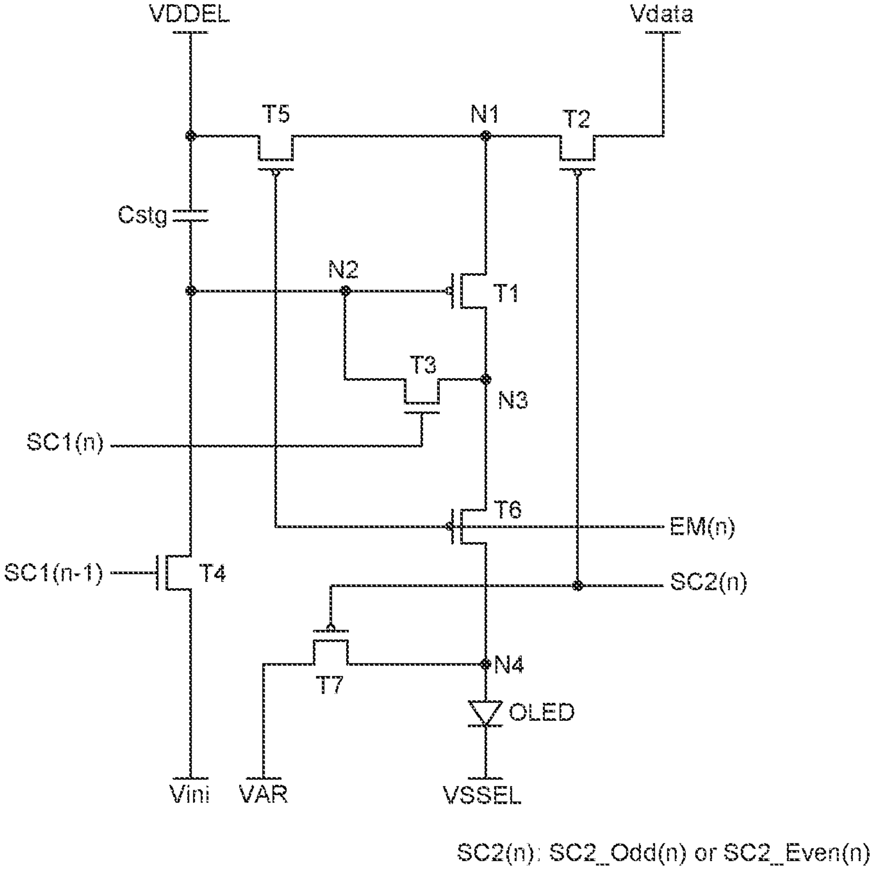
FIG. 12 is a circuit diagram illustrating a pixel of an organic light emitting display device according to still another exemplary embodiment of the present disclosure.

FIG. 12 is a circuit diagram illustrating a pixel of an organic light emitting display device according to still another exemplary embodiment (Example 4) of the present disclosure.

To be specific, FIG. 12 illustrates each pixel of an odd row and a circuit diagram of each pixel of an even row is the same as each pixel of an odd row except for an odd-numbered second scan signal SC2_Odd(n). In each pixel of an even row, an even-numbered second scan signal SC2_Even(n) is supplied instead of the odd-numbered second scan signal SC2_Odd(n).

Each pixel P includes an organic light emitting diode OLED, a driving transistor T1, second to seventh transistors T2 to T7, and a storage capacitor Cstg.

The organic light emitting diode OLED emits light by a driving current supplied from the driving transistor T1. A multilayered organic compound layer is formed between the anode electrode and the cathode electrode of the organic light emitting diode OLED. The organic compound layer includes at least one of a hole transfer layer and an electron transfer layer, and an emission layer (EML). Here, the hole transfer layer is a layer which injects or transfers holes to the emission layer and for example, may include a hole injection layer (HIL), a hole transport layer (HTL), and an electron blocking layer (EBL). The electron transfer layer is a layer which injects or transfers the electrons to the emission layer and for example, may include an electron transport layer (ETL), an electron injection layer (EIL), and a hole blocking layer (HBL). An anode electrode of the organic light emitting diode OLED is connected to a fourth node N4 and a cathode electrode of the organic light emitting diode is connected to an input terminal of a low potential driving voltage VSSEL.

The driving transistor T1 controls a driving current applied to the organic light emitting diode OLED in accordance with a source-gate voltage Vsg. The driving transistor T1 may be a p-type MOSFET (PMOS) and a low temperature polycrystalline silicon (LTPS) thin film transistor. A source electrode of the driving transistor T1 is connected to a first node N1, a gate electrode is connected to a second node N2, and a drain electrode is connected to a third node N3. The driving transistor T1 may be referred to as a first transistor.

The second transistor T2 applies a data voltage Vdata supplied from a data line to a first node N1 which is the source electrode of the driving transistor T1. The second transistor T2 may be a p-type MOSFET (PMOS) and a low temperature polycrystalline silicon (LTPS) thin film transistor. The second transistor T2 includes a source electrode connected to the data line, a drain electrode connected to the first node N1, and a gate electrode connected to a second scan signal line which transmits an odd-numbered second scan signal SC2_Odd(n). Accordingly, the second transistor T2 applies a data voltage Vdata supplied from the data line to the first node N1 which is the source electrode of the driving transistor T1, in response to a low level of the odd-numbered second scan signal SC2_Odd(n) which is a turn on level.

The third transistor T3 forms a diode connection between a gate electrode and a drain electrode of the driving transistor T1. The third transistor T3 may be an n-type MOSFET (NMOS) and an oxide thin film transistor to reduce a leakage current. The third transistor T3 includes a drain electrode connected to the third node N3, a source electrode connected to the second node N2, and a gate electrode connected to a first scan signal line which transmits a first scan signal SC1($n$). Therefore, the third transistor T3 forms a diode connection between the gate electrode and the drain electrode of the driving transistor T1 in response to a high level of the first scan signal SC1($n$) which is a turn on level.

The fourth transistor T4 applies an initialization voltage Vini to the second node N2 which is the gate electrode of the driving transistor T1. The fourth transistor T4 may be an n-type MOSFET (NMOS) and an oxide thin film transistor to reduce a leakage current. The fourth transistor T4 includes a source electrode connected to an initialization voltage line which transmits an initialization voltage Vini, a drain electrode connected to the second node N2, and a gate electrode connected to a first scan signal line of a previous stage which transmits a first scan signal SC1($n$−1) of the previous stage. Accordingly, the fourth transistor T4 applies the initialization voltage Vini to the second node N2 which is the gate electrode of the driving transistor T1, in response to a high level of first scan signal SC1($n$−1) of the previous stage which is a turn on level.

The fifth transistor T5 applies a high potential driving voltage VDDEL to the first node N1 which is the source electrode of the driving transistor T1. The fifth transistor T5 may be a p-type MOSFET (PMOS) and a low temperature polycrystalline silicon (LTPS) thin film transistor. The fifth transistor T5 includes a source electrode connected to a high potential driving voltage line which transmits a high potential driving voltage VDDEL, a drain electrode connected to the first node N1, and a gate electrode connected to an emission signal line which transmits an emission signal EM(n). Accordingly, the fifth transistor T5 applies the high potential driving voltage VDDEL to the first node N1 which is the source electrode of the driving transistor T1, in response to a low level of emission signal EM(n) which is a turn on level.

The sixth transistor T6 forms a current path between the driving transistor T1 and the organic light emitting diode OLED. The sixth transistor T6 may be a p-type MOSFET (PMOS) and a low temperature polycrystalline silicon (LTPS) thin film transistor. The sixth transistor T6 includes a source electrode connected to the third node N3, a drain electrode connected to the fourth node N4, and a gate electrode connected to the emission signal line which transmits an emission signal EM(n). The sixth transistor T6 forms a current path between the third node N3 which is the source electrode of the sixth transistor T6 and the fourth node N4 which is the drain electrode of the sixth transistor T6, in response to the emission signal EM(n). Accordingly, the sixth transistor T6 forms a current path between the driving transistor T1 and the organic light emitting diode OLED in response to a low level of emission signal EM(n) which is a turn on level.

The seventh transistor T7 applies a reset voltage VAR to the fourth anode N4 which is an anode of the organic light emitting diode. The seventh transistor T7 may be a p-type MOSFET (PMOS) and a low temperature polycrystalline silicon (LTPS) thin film transistor. The seventh transistor T7 includes a source electrode connected to the reset voltage line which transmits the reset voltage VAR, a drain electrode connected to the fourth node N4, and a gate electrode connected to a second scan signal line which transmits an odd-numbered second scan signal SC2_Odd(n). Accordingly, the seventh transistor T7 applies the reset voltage VAR to the fourth node N4 which is the anode of the organic light emitting diode, in response to a low level of odd-numbered second scan signal SC2_Odd(n) which is a turn on level.

The storage capacitor Cstg holds a data voltage Vdata stored in each pixel for one frame. The storage capacitor Cstg includes a first electrode connected to the second node N2 and a second electrode connected to the high potential driving voltage line which transmits a high potential driving voltage VDDEL. That is, one electrode of the storage capacitor Cstg is connected to the gate electrode of the driving transistor T1 and the other electrode of the storage capacitor Cstg is connected to the high potential driving voltage line VDL which transmits a high potential driving voltage VDDEL.

Figure 13A:
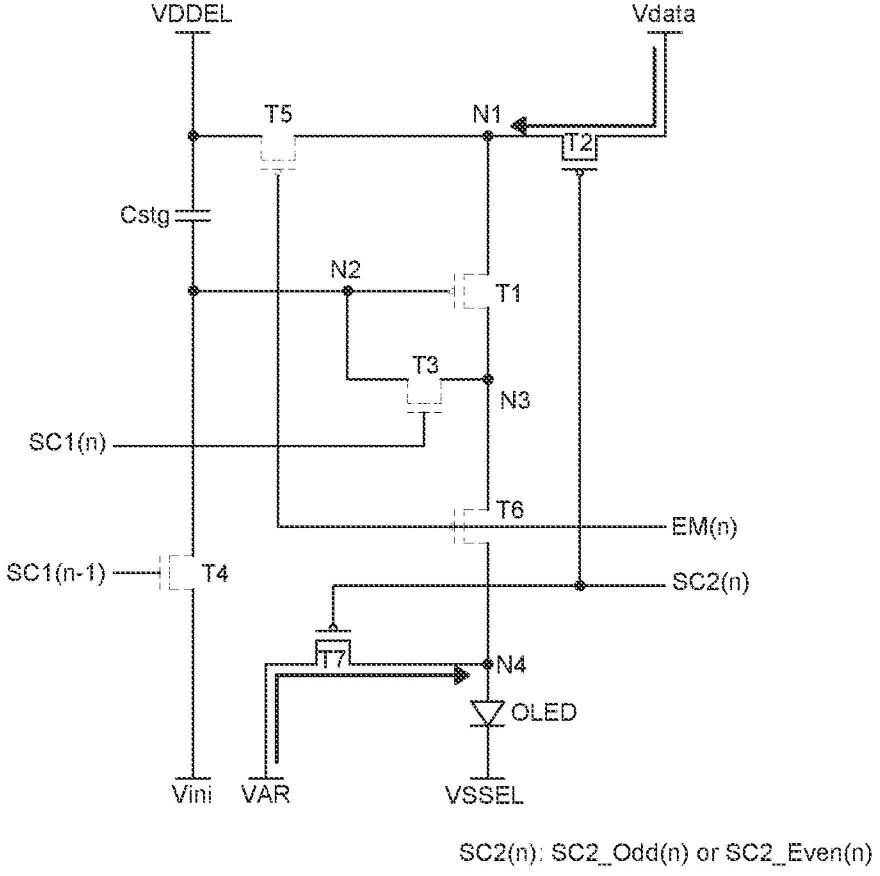
FIG. 13A is a circuit diagram of a pixel of an organic light emitting display device during an on bias stress period according to still another exemplary embodiment of the present disclosure.

FIG. 13A is a circuit diagram of a pixel of an organic light emitting display device during an on bias stress period according to still another exemplary embodiment (Example 4) of the present disclosure.

Figure 13B:
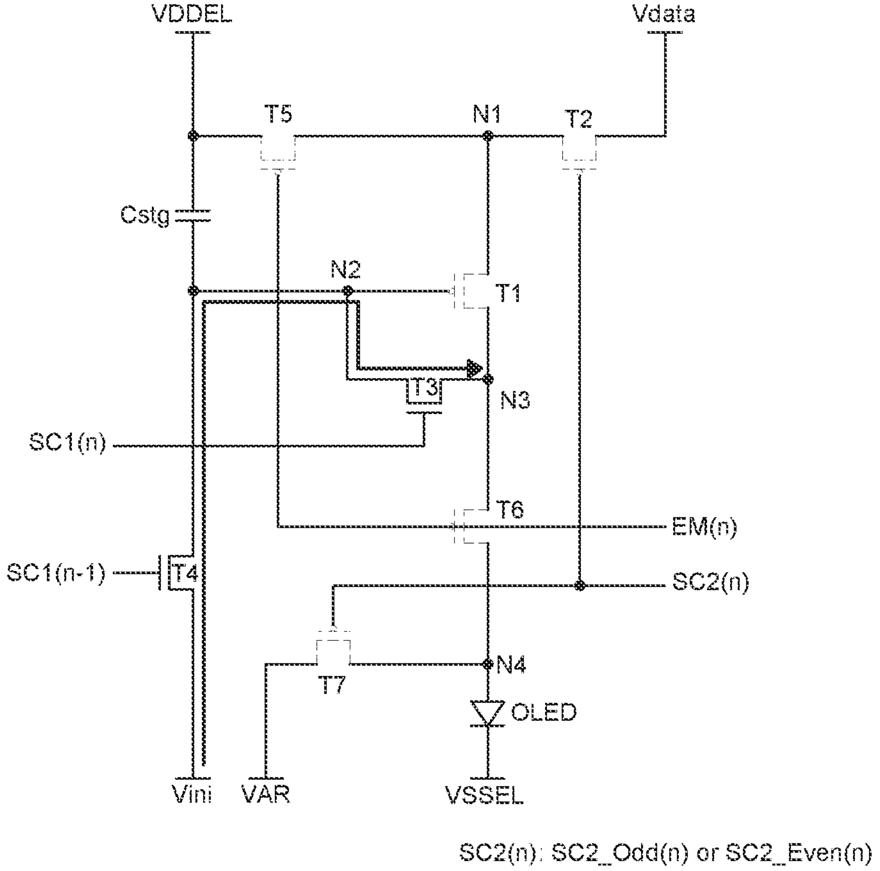
FIG. 13B is a circuit diagram of a pixel of an organic light emitting display device during an initial period according to still another exemplary embodiment of the present disclosure.

FIG. 13B is a circuit diagram of a pixel of an organic light emitting display device during an initial period according to still another exemplary embodiment (Example 4) of the present disclosure.

Figure 13C:
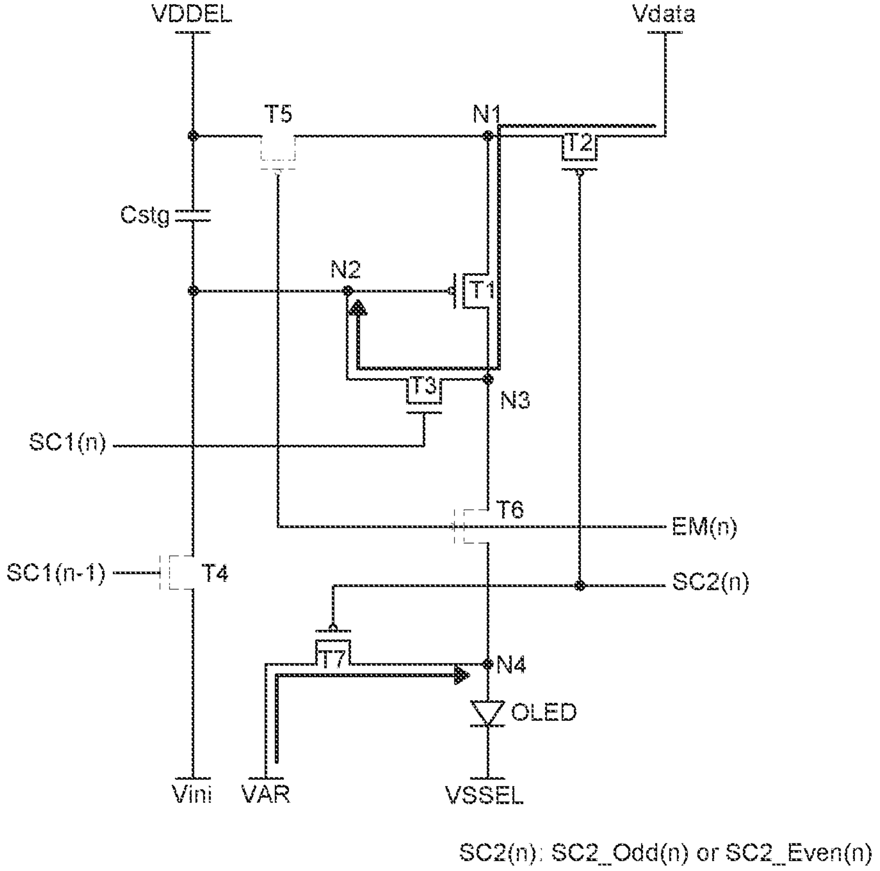
FIG. 13C is a circuit diagram of a pixel of an organic light emitting display device during a sampling period according to still another exemplary embodiment of the present disclosure.

FIG. 13C is a circuit diagram of a pixel of an organic light emitting display device during a sampling period according to still another exemplary embodiment (Example 4) of the present disclosure.

Figure 13D:
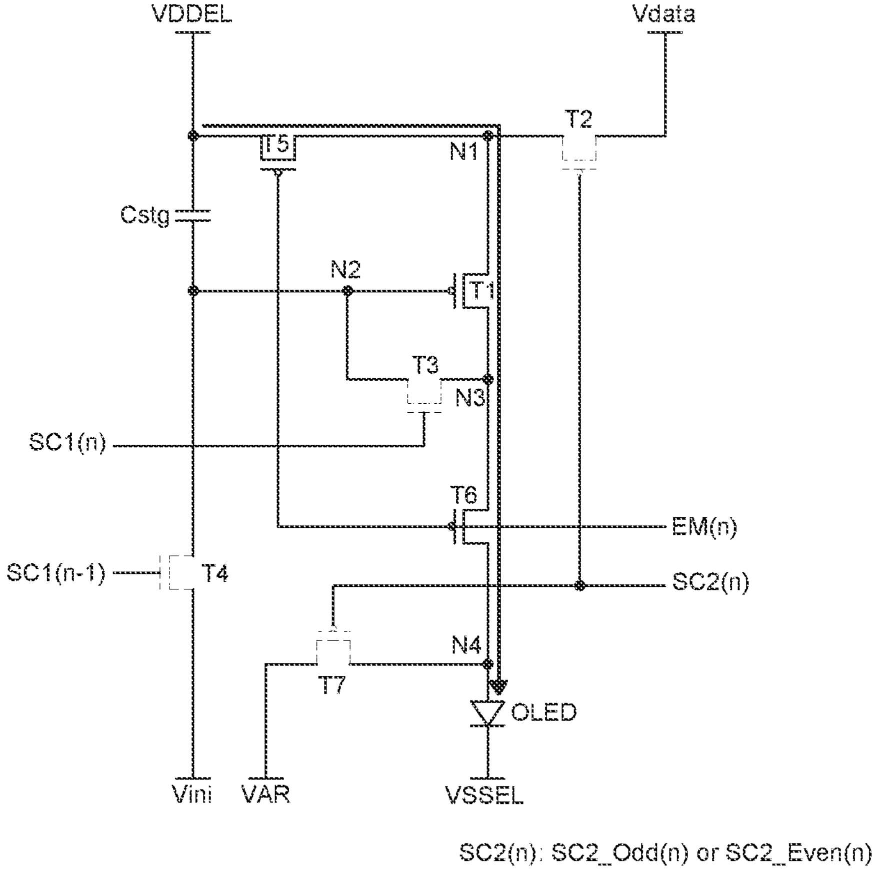
FIG. 13D is a circuit diagram of a pixel of an organic light emitting display device during an emission period according to still another exemplary embodiment of the present disclosure.

FIG. 13D is a circuit diagram of a pixel of an organic light emitting display device during an emission period according to still another exemplary embodiment (Example 4) of the present disclosure.

The driving of the pixel of the organic light emitting display device according to still another exemplary embodiment (Example 4) of the present disclosure will be described with reference to FIGS. 12 to 13D, as follows.

The organic light emitting display device according to still another exemplary embodiment (Example 4) of the present disclosure may be driven to be divided into a refresh frame and an anode reset frame. In the refresh frame, the data voltage Vdata is programmed in each pixel P and the organic light emitting diode OLED emits light. The anode reset frame may be a vertical blank frame and the anode electrode of the organic light emitting diode OLED is reset during the anode reset frame.

In the organic light emitting display device according to still another exemplary embodiment (Example 4) of the present disclosure, the anode reset frame may include a plurality of stress periods (on bias stress). The stress period (on bias stress) is a period in which a bias stress is applied to the first node N1 which is the source electrode of the driving transistor T1. Further, during the stress period, the anode electrode of the organic light emitting diode OLED may be reset. Further, as illustrated in FIG. 7, during the anode reset frame, the reset voltage VAR and the initialization voltage Vini are low levels and the data voltage Vdata is a high level.

Also, in the organic light emitting display device according to still another exemplary embodiment (Example 4) of the present disclosure, the refresh frame may be divided into an initial period, a sampling period, and an emission period. The initial period is a period in which the voltage of the second node N2 which is the gate electrode of the driving transistor T1 is initialized. The sampling period is a period in which a threshold voltage Vth of the driving transistor T1 is sampled and the data voltage Vdata is programmed. The emission period is a period in which the organic light emitting diode OLED emits light in accordance with the driving current by the source-gate voltage of the programmed driving transistor T1. As illustrated in FIG. 7, during the refresh frame, the reset voltage VAR and the initialization voltage Vini are low levels.

Specifically, referring to FIGS. 7 and 13A, during the stress period (on bias stress) of the anode reset frame, the odd-numbered second scan signal SC2_Odd(n) is a low level which is a turn on level. In other words, in the anode reset frame including a plurality of stress periods (on bias stress), the odd-numbered second scan signal SC2_Odd(n) may have a waveform including a plurality of pulses. In the anode reset frame including a plurality of stress periods (on bias stress), the data voltage Vdata is always a high level.

Therefore, the seventh transistor T7 is turned on to apply the reset voltage VAR to the fourth node N4. That is, the anode electrode of the organic light emitting diode OLED is reset to the reset voltage VAR.

Therefore, the second transistor T2 is turned on to apply a high level of data voltage Vdata to the first node N1. The high level of data voltage Vdata may be selected in a voltage range which is sufficiently higher than an operating voltage of the organic light emitting diode OLED and may be set to a voltage equal to or less than a high potential driving voltage VDDEL. That is, during the stress period (on bias stress), the on bias stress is applied to the first node N1 which is the source electrode of the driving transistor T1 to drop the gate-source voltage Vgs of the driving transistor T1. Accordingly, during the stress period (on bias stress), the source-drain current Ids of the driving transistor T1 flows to relieve the hysteresis of the driving transistor T1.

Referring to FIGS. 7 and 13B, during an initial period of the refresh frame, the first scan signal SC1(*n*) is a high level which is a turn on level and the first scan signal SC1(*n*−1) of the previous stage is a high level which is a turn on level. Therefore, the third transistor T3 and the fourth transistor T4 are turned on to apply the initialization voltage Vini to the third node N3 and the second node N2. As a result, the gate electrode and the drain electrode of the driving transistor T1 are initialized to the initialization voltage Vini. In the refresh frame, the initialization voltage Vini may be selected in a voltage range which is sufficiently less than an operating voltage of the organic light emitting diode OLED and may be set to a voltage equal to or less than a low potential driving voltage VSSEL.

Referring to FIGS. 7 and 13C, during a sampling period of the refresh frame, the first scan signal SC1(*n*) is a high level which is a turn on level and the odd-numbered second scan signal SC2_Odd(n) is a low level which is a turn on level. During the sampling period of the refresh frame, the first scan signal SC1(*n*) is a high level which is a turn on level, an odd-numbered second scan signal SC2_Odd(n) is a low level which is a turn on level, and an even-numbered second scan signal SC2_Even(n) is a low level which is a turn on level. In FIG. 7, in the refresh frame, the odd-numbered second scan signals SC2_Odd(n) is illustrated by a waveform including one pulse. However, the present disclosure is not limited thereto and the odd-numbered second scan signals SC2_Odd(n) may have a waveform including a plurality of pulses.

Therefore, during the sampling period, the second transistor T2 is turned on so that the data voltage Vdata is applied to the first node N1. Further, the third transistor T3 is also turned on so that the driving transistor T1 is diode-connected. Therefore, the gate electrode and the drain electrode of the driving transistor T1 are shorted so that the driving transistor T1 operates as a diode. During the sampling period, a current Ids flows between the source and the drain of the driving transistor T1. The gate electrode and the drain electrode of the driving transistor T1 are diode-connected, so that the voltage of the second node N2 rises by the current flowing from the source electrode to the drain electrode until the gate-source voltage Vgs of the driving transistor T1 becomes Vth. During the sampling period, the voltage of the second node N2 is charged with a voltage Vdata−|Vth| corresponding to the difference between the data voltage Vdata and the threshold voltage Vth of the driving transistor T1.

Further, during the sampling period of the refresh frame, the odd-numbered second scan signal SC2_Odd(n) is a low level which is a turn on level, so that the seventh transistor T7 is turned on to apply the reset voltage VAR to the fourth node N4. That is, the anode electrode of the organic light emitting diode OLED is reset to the reset voltage VAR.

Further, in the refresh frame, when the odd-numbered second scan signal SC2_Odd(n) has a waveform including a plurality of pulses, the second transistor T2 is turned on to apply the data voltage Vdata to the first node N1. Therefore, also in the refresh frame, the bias stress is applied to the first node N1 which is the source electrode of the driving transistor T1 to relieve the hysteresis of the driving transistor T1.

Referring to FIGS. 7 and 13D, during the emission period of the refresh frame, the emission signal EM(n) is a low level which is a turn on level. Therefore, the fifth transistor T5 is turned on to apply the high potential driving voltage VDDEL to the first node N1. The sixth transistor T6 is also turned on to form a current path of the third node N3 and the fourth node N4. As a result, a driving current Ioled passing through the source electrode and the drain electrode of the driving transistor T1 is applied to the organic light emitting diode OLED.

A relational expression of the driving current Ioled flowing through the organic light emitting diode OLED during the emission period is represented by the above-described Equation 1.

As seen from Equation 1, it is understood that in the relational expression of the driving current Ioled, a component of the threshold voltage Vth of the driving transistor T1 is eliminated so that even though in the display device of the present disclosure, the threshold voltage Vth changes, the driving current Ioled does not change. As described above, the display device of the present disclosure may program the data voltage regardless of the variation of the threshold voltage Vth during the sampling period.

As described above, the anode electrode of the organic light emitting diode OLED is reset to the reset voltage VAR in both the stress period of the anode reset frame and the sampling period of the refresh frame.

As a result, also in the organic light emitting display device according to still another exemplary embodiment (Example 4) of the present disclosure, the anode electrode of the organic light emitting diode OLED may be periodically reset during the refresh frame and the reset frame. Accordingly, the consistent rising of the voltage of the anode electrode of the organic light emitting diode OLED due to the leakage current is suppressed even in the driving at a low frequency so that the anode electrode of the organic light emitting diode OLED may maintain a constant voltage level. Accordingly, even though the driving frequency is switched to a low frequency, the luminance variance of the organic light emitting display device is reduced so that the image quality may be increased.

Through FIGS. 12 to 13D, a circuit driving method of each pixel of an odd row has been described. A circuit driving method of each pixel of even row is same as each pixel of an odd row except for an odd-numbered second scan signal SC2_Odd(n). In each pixel of an even row, an even-numbered second scan signal SC2_Even(n) is supplied instead of the odd-numbered second scan signal SC2_Odd (n).

The organic light emitting display device according to still another exemplary embodiment (Example 4) of the present disclosure uses a high level of data voltage Vdata to apply the on bias stress to the driving transistor T1. Accordingly, the organic light emitting display device according to still another exemplary embodiment (Example 4) of the present disclosure does not need to include a separate stage which swings the initialization voltage in the gate driver to apply the on bias stress.

Moreover, as illustrated in FIG. 9, the first gate driver 401 disposed at the left side of the display area A/A includes only the emission signal stage EM, an odd-numbered second scan signal stage SC2 Odd and an even-numbered second scan signal stage SC2 Even, and the second gate driver 402 disposed at the right side of the display area A/A includes only a first scan signal stage SC1, an odd-numbered second scan signal stage SC2_Odd and an even-numbered second scan signal stage SC2_Even. However, the first gate driver 401 and the second gate driver 402 may not include a third scan signal stage SC3.

Accordingly, a width of each of the first gate driver 401 and the second gate drier 402 may be reduced from 350 μm to 300 μm as compared with the organic light emitting display device according to still another exemplary embodiment (Example 3) of the present disclosure so that the width of the bezel may be further reduced. Further, there is no need to drive a third scan signal stage, so that the power consumption may also be reduced.

The exemplary embodiments of the present disclosure can also be described as follows:

According to an aspect of the present disclosure, an organic light emitting display device includes a display panel in which a plurality of pixels is disposed. Each of the plurality of pixels includes an organic light emitting diode configured to emit light by a driving current, a first transistor configured to control the driving current and including a source electrode which is a first node, a gate electrode which is a second node, and a drain electrode which is a third node, a second transistor configured to apply a data voltage to the first node, a third transistor configured to form a diode connection between the second node and the third node, a fourth transistor configured to apply an initialization voltage to the first transistor, a fifth transistor configured to apply a high potential driving voltage to the first node, a sixth transistor configured to form a current path between the driving transistor and the organic light emitting diode, a seventh transistor configured to apply a reset voltage to a fourth node which is an anode electrode of the organic light emitting diode, and a storage capacitor including one electrode connected to the second node and the other electrode connected to a high potential driving voltage line which transmits the high potential driving voltage. The organic light emitting display device is driven to be divided into a refresh frame when the data voltage is programmed in the pixel and a reset frame when the anode electrode of the organic light emitting diode is reset, and the data voltage is maintained to a first level during the reset frame. Accordingly, a separate stage for applying an on bias stress is not provided so that the bezel may be reduced.

The reset frame may include a plurality of on bias stress periods.

During the on bias stress period, the second transistor may be turned on to apply a first level of data voltage to the first node and the seventh transistor may be turned on to reset the fourth node to the reset voltage.

The third transistor may be an n-type oxide thin film transistor and the first transistor, the second transistor, and the fourth to seventh transistors may be p-type low temperature polycrystalline silicon (LTPS) thin film transistors.

During the refresh frame, the initialization voltage which is applied to the fourth transistor may be a second level and during the reset frame, the initialization voltage which is applied to the fourth transistor may be a first level.

The third transistor and the fourth transistor may be an n-type oxide thin film transistor and the first transistor, the second transistor, and the fifth to seventh transistors may be p-type low temperature polycrystalline silicon (LTPS) thin film transistors.

During the refresh frame and the reset frame, the initialization voltage which is applied to the fourth transistor may be a second level.

The first transistor may include a source electrode connected to the first node, a drain electrode connected to the third node, and a gate electrode connected to the second node, the second transistor may include a source electrode connected to a data line which transmits the data voltage, a drain electrode connected to the first node, and a gate electrode connected to a second scan signal line which transmits a second scan signal, the third transistor may include a source electrode connected to the second node, a drain electrode connected to the third node, and a gate electrode connected to a first scan signal line which transmits a first scan signal. the fourth transistor may include a source electrode connected to an initialization voltage line which transmits the initialization voltage, a drain electrode connected to the third node, and a gate electrode connected to a third scan signal line which transmits a third scan signal, the fifth transistor may include a source electrode connected to the high potential driving voltage line, a drain electrode connected to the first node, and a gate electrode connected to an emission signal line which transmits an emission signal, the sixth transistor may include a source electrode connected to the third node, a drain electrode connected to the fourth node, and a gate electrode connected to the emission signal line, and the seventh transistor may include a source electrode connected to a reset voltage line which transmits a reset voltage, a drain electrode connected to the fourth node, and a gate electrode connected to the second scan signal line.

The first transistor may include a source electrode connected to the first node, a drain electrode connected to the third node, and a gate electrode connected to the second node, the second transistor may include a source electrode connected to a data line which transmits the data voltage, a drain electrode connected to the first node, and a gate electrode connected to a second scan signal line which transmits a second scan signal, the third transistor may include a source electrode connected to the second node, a drain electrode connected to the third node, and a gate electrode connected to a first scan signal line which transmits a first scan signal, the fourth transistor may include a source electrode connected to an initialization voltage line which transmits the initialization voltage, a drain electrode connected to the third node, and a gate electrode connected to a first scan signal line of a previous stage which transmits a first scan signal of the previous stage, the fifth transistor may include a source electrode connected to the high potential driving voltage line, a drain electrode connected to the first node, and a gate electrode connected to an emission signal line which transmits an emission signal; the sixth transistor may include a source electrode connected to the third node, a drain electrode connected to the fourth node, and a gate electrode connected to the emission signal line, and the seventh transistor may include a source electrode connected to a reset voltage line which transmits a reset voltage, a drain electrode connected to the fourth node, and a gate electrode connected to the second scan signal line.

The first transistor may include a source electrode connected to the first node, a drain electrode connected to the third node, and a gate electrode connected to the second node, the second transistor may include a source electrode connected to a data line which transmits the data voltage, a drain electrode connected to the first node, and a gate electrode connected to a second scan signal line which transmits a second scan signal, the third transistor may include a source electrode connected to the second node, a drain electrode connected to the third node, and a gate electrode connected to a first scan signal line which transmits a first scan signal, the fourth transistor may include a source electrode connected to an initialization voltage line which transmits the initialization voltage, a drain electrode connected to the second node, and a gate electrode connected to a third scan signal line which transmits a third scan signal, the fifth transistor may include a source electrode connected to the high potential driving voltage line, a drain electrode connected to the first node, and a gate electrode connected to an emission signal line which transmits an emission signal; the sixth transistor may include a source electrode connected to the third node, a drain electrode connected to the fourth node, and a gate electrode connected to the emission signal line, and the seventh transistor may include a source electrode connected to a reset voltage line which transmits a reset voltage, a drain electrode connected to the fourth node, and a gate electrode connected to the second scan signal line.

The first transistor may include a source electrode connected to the first node, a drain electrode connected to the third node, and a gate electrode connected to the second node, the second transistor may include a source electrode connected to a data line which transmits the data voltage, a drain electrode connected to the first node, and a gate electrode connected to a second scan signal line which transmits a second scan signal, the third transistor may include a source electrode connected to the second node, a drain electrode connected to the third node, and a gate electrode connected to a first scan signal line which transmits a first scan signal, the fourth transistor may include a source electrode connected to an initialization voltage line which transmits the initialization voltage, a drain electrode connected to the second node, and a gate electrode connected to a first scan signal line of a previous stage which transmits a first scan signal of the previous stage, the fifth transistor may include a source electrode connected to the high potential driving voltage line, a drain electrode connected to the first node, and a gate electrode connected to an emission signal line which transmits an emission signal, the sixth transistor may include a source electrode connected to the third node, a drain electrode connected to the fourth node, and a gate electrode connected to the emission signal line, and the seventh transistor may include a source electrode connected to the reset voltage line which transmits a reset voltage, a drain electrode connected to the fourth node, and a gate electrode connected to the second scan signal line.

The refresh frame may be divided into an initial period, a sampling period, and an emission period, during the initial period, the second node or the third node may be initialized to the initialization voltage, during the sampling period, the second node may be charged with a voltage corresponding to a difference between the data voltage and a threshold voltage of the first transistor, and during the emission period, the driving current may flow to the organic light emitting diode to emit light.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. An organic light emitting display device, comprising:

a display panel in which a plurality of pixels are disposed, wherein each of the plurality of pixels includes:

an organic light emitting diode configured to emit light by a driving current;

a first transistor configured to control the driving current, the first transistor including a source electrode which is a first node, a gate electrode which is a second node, and a drain electrode which is a third node;

a second transistor configured to apply a data voltage to the first node;

a third transistor configured to form a diode connection between the second node and the third node;

a fourth transistor configured to apply an initialization voltage to the first transistor;

a fifth transistor configured to apply a high potential driving voltage to the first node;

a sixth transistor configured to form a current path between the first transistor and the organic light emitting diode;

a seventh transistor configured to apply a reset voltage to a fourth node which is an anode electrode of the organic light emitting diode; and a storage capacitor including a first electrode connected to the second node and a second electrode connected to a high potential driving voltage line which transmits the high potential driving voltage, the organic light emitting display device is driven to be divided into a refresh frame when the data voltage that alternates between a plurality of different levels is programmed in the pixel and a reset frame when the anode electrode of the organic light emitting diode is reset, and the data voltage is maintained to a first level that is substantially constant during the reset frame, wherein the second transistor includes a source electrode connected to a data line which transmits the data voltage, a drain electrode connected to the first node, and a gate electrode connected to a second scan signal line which transmits a second scan signal, wherein the seventh transistor includes a source electrode connected to a reset voltage line which transmits a reset voltage, a drain electrode connected to the fourth node, and a gate electrode connected to the second scan signal line, wherein during the reset frame, the second transistor is turned on by the second scan signal to apply the first level data voltage that is substantially constant to the first node and the seventh transistor is turned on by the second scan signal to apply the reset voltage to the anode electrode of the organic light emitting diode, wherein during the refresh frame, the second transistor is turned on by the second scan signal to apply the data voltage that alternates between the plurality of different levels to the first node and the seventh transistor is turned on by the second scan signal to apply the reset voltage to the anode electrode of the organic light emitting diode, and wherein, in all periods of the reset frame and the refresh frame, the second transistor and the seventh transistor are simultaneously turned on and simultaneously turned off.

2. The organic light emitting display device according to claim 1, wherein the reset frame includes a plurality of on bias stress periods, and during an on bias stress period from the plurality of on bias stress periods, the second transistor is turned on to apply a first level of data voltage to the first node and the seventh transistor is turned on to reset the fourth node to the reset voltage.

3. The organic light emitting display device according to claim 1, wherein the third transistor is an n-type oxide thin film transistor and the first transistor, the second transistor, and the fourth to seventh transistors are p-type low temperature polycrystalline silicon (LTPS) thin film transistors.

4. The organic light emitting display device according to claim 3, wherein during the refresh frame, the initialization voltage which is applied to the fourth transistor is at a second level and during the reset frame, the initialization voltage which is applied to the fourth transistor is at a first level.

5. The organic light emitting display device according to claim 1, wherein the third transistor and the fourth transistor are an n-type oxide thin film transistor and the first transistor, the second transistor, and the fifth to seventh transistors are p-type low temperature polycrystalline silicon (LTPS) thin film transistors.

6. The organic light emitting display device according to claim 5, wherein during the refresh frame and the reset frame, the initialization voltage which is applied to the fourth transistor is a second level.

7. The organic light emitting display device according to claim 1, wherein the first transistor includes a source electrode connected to the first node, a drain electrode connected to the third node, and a gate electrode connected to the second node, the third transistor includes a source electrode connected to the second node, a drain electrode connected to the third node, and a gate electrode connected to a first scan signal line which transmits a first scan signal;

the fourth transistor includes a source electrode connected to an initialization voltage line which transmits the initialization voltage, a drain electrode connected to the third node, and a gate electrode connected to a third scan signal line which transmits a third scan signal, the fifth transistor includes a source electrode connected to the high potential driving voltage line, a drain electrode connected to the first node, and a gate electrode connected to an emission signal line which transmits an emission signal; and the sixth transistor includes a source electrode connected to the third node, a drain electrode connected to the fourth node, and a gate electrode connected to the emission signal line.

8. The organic light emitting display device according to claim 1, wherein the first transistor includes a source electrode connected to the first node, a drain electrode connected to the third node, and a gate electrode connected to the second node, the third transistor includes a source electrode connected to the second node, a drain electrode connected to the third node, and a gate electrode connected to a first scan signal line which transmits a first scan signal;

the fourth transistor includes a source electrode connected to an initialization voltage line which transmits the initialization voltage, a drain electrode connected to the third node, and a gate electrode connected to a first scan signal line of a previous stage which transmits a first scan signal of the previous stage, the fifth transistor includes a source electrode connected to the high potential driving voltage line, a drain electrode connected to the first node, and a gate electrode connected to an emission signal line which transmits an emission signal;

the sixth transistor includes a source electrode connected to the third node, a drain electrode connected to the fourth node, and a gate electrode connected to the emission signal line.

9. The organic light emitting display device according to claim 1, wherein the first transistor includes a source electrode connected to the first node, a drain electrode connected to the third node, and a gate electrode connected to the second node, the third transistor includes a source electrode connected to the second node, a drain electrode connected to the third node, and a gate electrode connected to a first scan signal line which transmits a first scan signal;

the fourth transistor includes a source electrode connected to an initialization voltage line which transmits the initialization voltage, a drain electrode connected to the second node, and a gate electrode connected to a third scan signal line which transmits a third scan signal, the fifth transistor includes a source electrode connected to the high potential driving voltage line, a drain electrode connected to the first node, and a gate electrode connected to an emission signal line which transmits an emission signal; and the sixth transistor includes a source electrode connected to the third node, a drain electrode connected to the fourth node, and a gate electrode connected to the emission signal line.

10. The organic light emitting display device according to claim 1, wherein the first transistor includes a source electrode connected to the first node, a drain electrode connected to the third node, and a gate electrode connected to the second node, the third transistor includes a source electrode connected to the second node, a drain electrode connected to the third node, and a gate electrode connected to a first scan signal line which transmits a first scan signal;

the fourth transistor includes a source electrode connected to an initialization voltage line which transmits the initialization voltage, a drain electrode connected to the second node, and a gate electrode connected to a first scan signal line of a previous stage which transmits a first scan signal of the previous stage, the fifth transistor includes a source electrode connected to the high potential driving voltage line, a drain electrode connected to the first node, and a gate electrode connected to an emission signal line which transmits an emission signal;

the sixth transistor includes a source electrode connected to the third node, a drain electrode connected to the fourth node, and a gate electrode connected to the emission signal line.

11. The organic light emitting display device according to claim 1, wherein the refresh frame is divided into an initial period, a sampling period, and an emission period, during the initial period, the second node or the third node is initialized to the initialization voltage, during the sampling period, the second node is charged with a voltage corresponding to a difference between the data voltage and a threshold voltage of the first transistor, and during the emission period, the driving current flows to the organic light emitting diode to emit light.

* * * * *